(12) United States Patent
Kato

(10) Patent No.: US 10,795,371 B2
(45) Date of Patent: Oct. 6, 2020

(54) VEHICLE CONTROL DEVICE, VEHICLE CONTROL METHOD, AND STORAGE MEDIUM

(71) Applicant: HONDA MOTOR CO., LTD., Minato-ku, Tokyo (JP)

(72) Inventor: Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 92 days.

(21) Appl. No.: 16/112,897

(22) Filed: Aug. 27, 2018

(65) Prior Publication Data
US 2019/0072971 A1 Mar. 7, 2019

(30) Foreign Application Priority Data

Sep. 1, 2017 (JP) .................................. 2017-168710

(51) Int. Cl.
*G05D 1/02* (2020.01)
*G06K 9/00* (2006.01)
*B60W 50/00* (2006.01)
*G08G 1/16* (2006.01)

(52) U.S. Cl.
CPC ....... *G05D 1/0214* (2013.01); *B60W 50/0097* (2013.01); *G05D 1/021* (2013.01); *G06K 9/00791* (2013.01); *G06K 9/00798* (2013.01); *G06K 9/00805* (2013.01);
(Continued)

(58) Field of Classification Search
CPC ................ G05D 1/0214; G05D 1/021; G05D 2201/0213; G05D 1/0891; G05D 1/0278; G05D 1/0274; G05D 1/027; G05D 1/0257; G05D 1/0251; G06K 9/00791; G06K 9/00805; G06K 9/00798; B60W 50/0097;
(Continued)

(56) References Cited

U.S. PATENT DOCUMENTS

2011/0313664 A1* 12/2011 Sakai .................... B60W 30/08
701/301
2013/0131925 A1* 5/2013 Isaji ........................ B62D 6/00
701/41
(Continued)

FOREIGN PATENT DOCUMENTS

JP 2008-117082 5/2008
JP 2010-018062 1/2010
(Continued)

OTHER PUBLICATIONS

Machine Translation of JP 2011221667, created Jan. 16, 2020.*
(Continued)

*Primary Examiner* — Rami Khatib
(74) *Attorney, Agent, or Firm* — Amin, Turocy & Watson, LLP

(57) ABSTRACT

A vehicle control device according to an embodiment includes a recognition unit recognizing surrounding vehicles of a subject vehicle and a potential setting unit setting a target object potential based on the surrounding vehicles recognized by the recognition unit for a plurality of separate areas acquired by dividing a road area and differently setting the target object potential in accordance with whether or not the subject vehicle or the surrounding vehicles are running in a predetermined running environment.

10 Claims, 17 Drawing Sheets

(52) U.S. Cl.
CPC . *B60W 2554/00* (2020.02); *G05D 2201/0213* (2013.01); *G08G 1/166* (2013.01)

(58) Field of Classification Search
CPC .............. B60W 2550/10; B60W 30/16; B60W 30/18145; G08G 1/166
See application file for complete search history.

(56) References Cited

U.S. PATENT DOCUMENTS

| | | | | |
|---|---|---|---|---|
| 2013/0204516 | A1* | 8/2013 | Fukamachi | G08G 1/166 701/300 |
| 2016/0272199 | A1* | 9/2016 | Kawahara | B60W 30/16 |
| 2016/0313738 | A1* | 10/2016 | Kindo | G05D 1/0212 |
| 2017/0039855 | A1* | 2/2017 | Maeda | B60K 31/0008 |
| 2017/0225686 | A1* | 8/2017 | Takaso | G08G 1/167 |

FOREIGN PATENT DOCUMENTS

| | | |
|---|---|---|
| JP | 2010-023721 | 2/2010 |
| JP | 2011-221667 | 11/2011 |
| JP | 2013-186722 | 9/2013 |
| JP | 2015-110403 | 6/2015 |
| WO | 2012/032624 | 3/2012 |
| WO | 2017/141765 | 8/2017 |

OTHER PUBLICATIONS

Machine Translation of JP 2010018062, Created Jan. 16, 2020.*
Japanese Office Action for Japanese Patent Application No. 2017-168710 dated Jun. 25, 2019.
Japanese Notice of Allowance for Japanese Patent Application No. 2017-168710 dated Jan. 14, 2020.

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2017-168710, filed Sep. 1, 2017, the content of which is incorporated herein by reference.

BACKGROUND OF THE INVENTION

Field of the Invention

The present invention relates to a vehicle control device, a vehicle control method, and a storage medium.

Description of Related Art

Conventionally, technologies for setting a target position and a target posture of a subject vehicle in the future that are based on dead-angle positions in a case in which presence/absence of a dead angle is determined based on an image of the subject vehicle captured in an advancement direction thereof, and it is determined that there is a dead angle are known (for example, Japanese Unexamined Patent Application, First Publication No. 2013-186722).

SUMMARY OF THE INVENTION

However, in a technology disclosed in Patent Document 1, variations in the degree of influence of surrounding vehicles on the subject vehicle according to running environments of the subject vehicle are not considered, and there are cases in which an appropriate running locus cannot be generated.

An aspect of the present invention was in view of such situations, and one object thereof is to provide a vehicle control device, a vehicle control method, and a storage medium capable of generating a more appropriate running locus in accordance with running environments.

A vehicle control device, a vehicle control method, and a storage medium according to the present invention employ the following configurations.

(1) According to one aspect of the present invention, there is provided a vehicle control device including: a recognition unit recognizing surrounding vehicles of a subject vehicle; and a potential setting unit setting a target object potential based on the surrounding vehicles recognized by the recognition unit for a plurality of separate areas acquired by dividing a road area and differently setting the target object potential in accordance with whether or not the subject vehicle or the surrounding vehicles are running in a predetermined running environment.

(2) In the aspect (1) described above, the predetermined running environment is a curved road, and the potential setting unit sets the target object potential in a case in which the subject vehicle or the surrounding vehicles are running on a curved road as being different from that of a case in which the subject vehicle or the surrounding vehicles are not running on a curved road.

(3) In the aspect (2) described above, the potential setting unit changes a degree of difference in setting the target object potential on the basis of a curvature of the curved road.

(4) In the aspect (3) described above, the predetermined running environment is a curved road having a predetermined curvature or more, and the potential setting unit differently sets the target object potential in a case in which the subject vehicle or the surrounding vehicles are running on a curved road having a predetermined curvature or more and a case in which the subject vehicle or the surrounding vehicles are not running on a curved road having the predetermined curvature or more.

(5) In the aspect (1) described above, the potential setting unit differently sets a degree of change in the target object potential on the basis of positions and behaviors of the surrounding vehicles.

(6) In the aspect (1) described above, the recognition unit recognizes a road partition line between a position of the subject vehicle and positions of the surrounding vehicles, and the potential setting unit differently sets the target object potential in a case in which the road partition line is recognized by the recognition unit and a case in which the road partition line is not recognized.

(7) In the aspect (1) described above, the potential setting unit differently sets the target object potential in a case in which a high likelihood of a change in a behavior of the surrounding vehicles is predicted and a case in which a high likelihood is not predicted on the basis of a running environment of the surrounding vehicles.

(8) In the aspect (1) described above, an induced potential setting unit setting an induced potential based on the road area for a plurality of separate areas acquired by dividing the road area, an evaluation unit deriving an index value acquired by evaluating a potential of a separate area of interest on the basis of the target object potential and the induced potential set in the separate area of interest among the plurality of separate areas and prediction information generated for a surrounding separate area selected from surroundings of the separate area of interest, a selection unit selecting one or more separate areas along an advancement direction of the subject vehicle from the plurality of separate areas on the basis of the index value derived by the evaluation unit, and a locus generating unit generating a future running locus of the subject vehicle on the basis of one or more separate areas along the advancement direction of the subject vehicle that are selected by the selection unit are further included.

(9) According to one aspect of the present invention, there is provided a vehicle control method executed by a computer mounted in a vehicle including: recognizing surrounding vehicles of a subject vehicle; setting a target object potential based on the recognized surrounding vehicles for a plurality of separate areas acquired by dividing a road area; and differently setting the target object potential in accordance with whether or not the subject vehicle or the surrounding vehicles are running in a predetermined running environment.

(10) According to one aspect of the present invention, there is provided a computer-readable non-transitory storage medium storing a program thereon, the program causing a computer to execute: recognizing surrounding vehicles of a subject vehicle; setting a target object potential based on the recognized surrounding vehicles for a plurality of separate areas acquired by dividing a road area; and differently setting the target object potential in accordance with whether or not the subject vehicle or the surrounding vehicles are running in a predetermined running environment.

According to the aspects (1) to (10) described above, a more appropriate running locus can be generated in accordance with running environments.

DETAILED DESCRIPTION OF THE INVENTION

Hereinafter, a vehicle control device, a vehicle control method, and a storage medium according to an embodiment of the present invention will be described with reference to the drawings. In the following embodiment, a vehicle control device is assumed to be applied to an automated driving vehicle. Here, automated driving, for example, represents causing a subject vehicle to run by automatically controlling at least one of speed and steering of the subject vehicle M.

[Entire Configuration]

Figure 1:
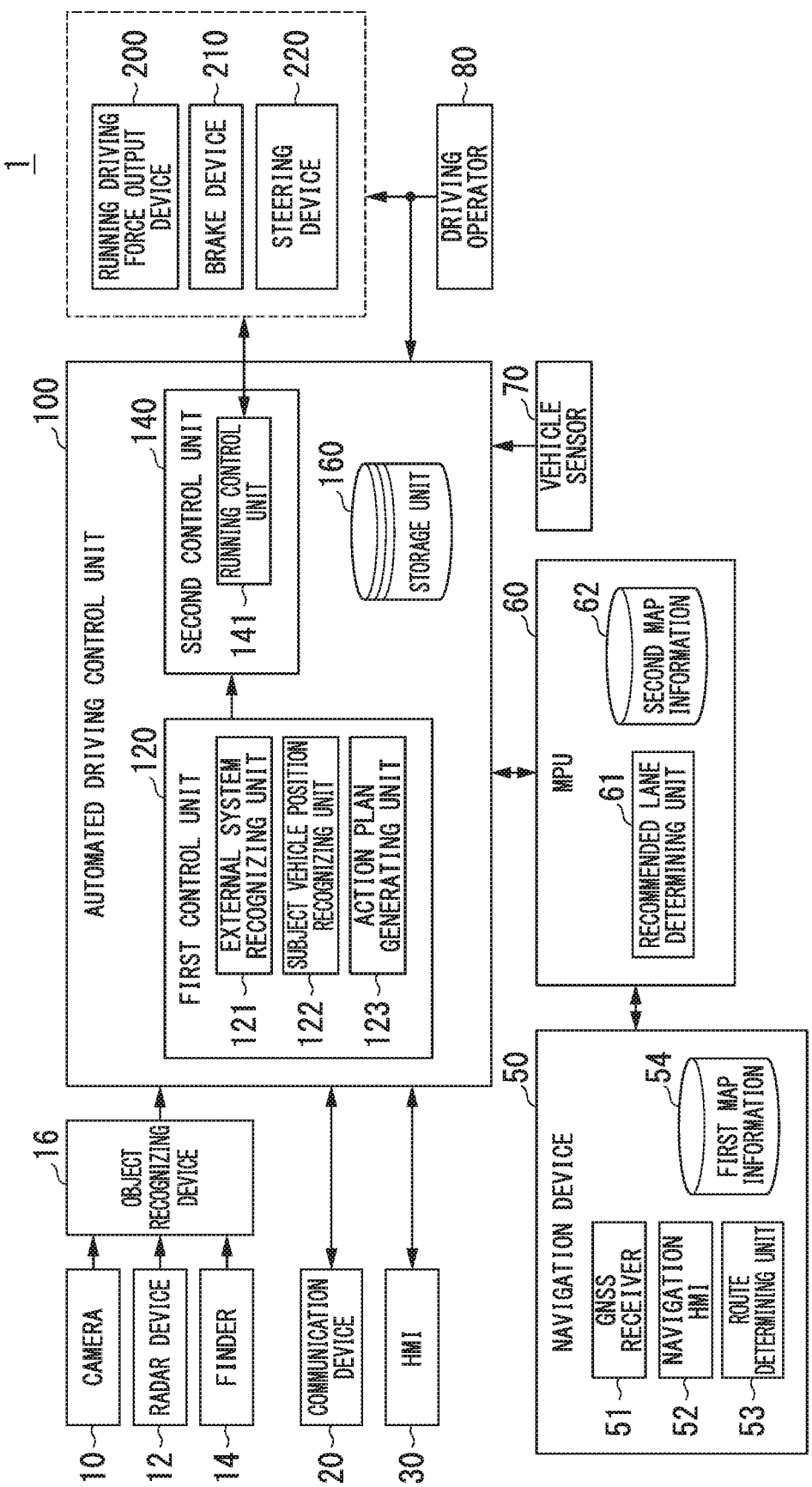
FIG. 1 is a configuration diagram of a vehicle system including an automated driving control unit.

FIG. 1 is a configuration diagram of a vehicle system 1 including an automated driving control unit 100. A vehicle in which the vehicle system 1 is mounted is, for example, a vehicle having two wheels, three wheels, four wheels, or the like, and a driving source thereof is an internal combustion engine such as a diesel engine or a gasoline engine, an electric motor, or a combination thereof. An electric motor operates using power generated using a power generator connected to an internal combustion engine or power discharged from a secondary cell or a fuel cell.

The vehicle system 1, for example, includes a camera 10, a radar device 12, a finder 14, an object recognizing device 16, a communication device 20, a human machine interface (HMI) 30, an electronic toll collection system (ETC) in-vehicle unit 40, a navigation device 50, a micro-processing unit (MPU) 60, a vehicle sensor 70, a driving operator 80, an automated driving control unit 100, a running driving force output device 200, a brake device 210, and a steering device 220. Such devices and units are interconnected using a multiplex communication line such as a controller area network (CAN) communication line, a serial communication line, a radio communication network, or the like. The configuration illustrated in FIG. 1 is merely one example, and thus, a part of the configuration may be omitted, and, other components may further be added thereto. The automated driving control unit 100 is one example of a "vehicle control device."

The camera 10, for example, is a digital camera using a solid-state imaging device such as a charge coupled device (CCD) or a complementary metal oxide semiconductor (CMOS). One or a plurality of cameras 10 are installed at arbitrary places on a vehicle (hereinafter, referred to as a subject vehicle M) in which the vehicle system 1 is mounted. In a case in which the side in front is to be imaged, the camera 10 is installed at an upper part of a front windshield, a rear face of a rear-view mirror, or the like. The camera 10, for example, repeatedly images the vicinity of the subject vehicle M periodically. The camera 10 may be a stereo camera.

The radar device 12 emits radiowaves such as millimeter waves to the vicinity of the subject vehicle M and detects at least a position (a distance and an azimuth) of an object by detecting radiowaves (reflected waves) reflected by the object. One or a plurality of radar devices 12 are installed at arbitrary places on the subject vehicle M. The radar device 12 may detect a position and a speed of an object using a frequency modulated continuous wave (FM-CW) system.

The finder 14 is a light detection and ranging or a laser imaging detection and ranging (LIDAR) finder that detects a distance to a target by measuring scattering light from emitted light. One or a plurality of finders 14 are installed at arbitrary places in the subject vehicle M.

The object recognizing device 16 may perform a sensor fusion process on results of detection using some or all of the camera 10, the radar device 12, and the finder 14, thereby allowing recognition of a position, a type, a speed, and the like of an object. The object recognizing device 16 outputs results of recognition to the automated driving control unit 100.

The communication device 20, for example, communicates with other vehicles (surrounding vehicles) present in the vicinity of the subject vehicle M using a cellular network, a Wi-Fi network, Bluetooth (registered trademark), dedicated short range communication (DSRC), or the like or communicates with various server apparatuses through a radio base station.

The HMI 30 presents various types of information to a vehicle occupant of the subject vehicle M and receives an input operation performed by a vehicle occupant. The HMI 30, for example, includes a touch panel, a switch, or the like not illustrated in the drawing. The touch panel, for example, may have a configuration in which a display device such as a liquid crystal display (LCD) or an organic electro luminescence (EL) display and a touch pad are combined.

The navigation device 50, for example, includes a global navigation satellite system (GNSS) receiver 51, a navigation HMI 52, and a route determining unit 53 and stores first map information 54 in a storage device such as a hard disk drive (HDD) or a flash memory. The GNSS receiver identifies a position of a subject vehicle M on the basis of signals received from GNSS satellites. The position of the subject vehicle M may be identified or complemented by an inertial navigation system (INS) using an output of the vehicle sensor 70. The navigation HMI 52 includes a display device, a speaker, a touch panel, a key, and the like. A part or the whole of the navigation HMI 52 and the HMI 30 described above may be configured to be shared. The route determining unit 53, for example, determines a route from a location of the subject vehicle M identified by the GNSS receiver 51 (or an input arbitrary location) to a destination input by a vehicle occupant using the navigation HMI 52 by referring to the first map information 54. The first map information 54, for example, is information in which a road form is represented by respective links representing a road and respective nodes connected using the links. The first map information 54 may include a curvature of each road, point of interest (POI) information, and the like. The route determined by the route determining unit 53 is output to the MPU 60. The navigation device 50 may perform route guidance using the navigation HMI 52 on the basis of the route determined by the route determining unit 53. The navigation device 50, for example, may be realized by a function of a terminal device such as a smartphone or a tablet terminal held by a user. The navigation device 50 may transmit a current location and a destination to a navigation server through the communication device 20 and acquire a route received from the navigation server as a reply.

The MPU 60, for example, functions as a recommended lane determining unit 61 and maintains second map information 62 in a storage device such as a HDD or a flash memory. The recommended lane determining unit 61 divides a route provided from the navigation device 50 into a plurality of blocks (for example, divides the route into blocks of 100 [m] in the advancement direction of the vehicle) and determines a target lane for each block by referring to the second map information 62. The recommended lane determining unit 61 determines running on a specific lane from the left side. In a case in which a branching point, a merging point, or the like is present in the route, the recommended lane determining unit 61 determines a recommended lane such that the subject vehicle M can run on a reasonable route for advancement to divergent destinations.

The second map information 62 is map information having an accuracy higher than that of the first map information 54. The second map information 62, for example, includes information of the center of respective lanes, information on boundaries between lanes, or the like. In the second map information 62, road information, traffic regulations information, address information (address and zip code), facilities information, telephone information, and the like may be included. In the road information, information representing a type of road such as an expressway, a toll road, a national road, or a prefectural road and information such as the number of lanes of a road, a width of each lane, a gradient of a road, a position of a road (three-dimensional coordinates including longitude, latitude, and a height), a curvature of the curve of a lane, locations of merging and branching points of lanes, a sign installed on a road, and the like are included. The second map information 62 may be updated as is necessary by accessing another device using the communication device 20.

The vehicle sensor 70 includes a vehicle speed sensor detecting a speed of the subject vehicle M, an acceleration sensor detecting an acceleration, a yaw rate sensor detecting an angular velocity around a vertical axis, an azimuth sensor detecting the azimuth of the subject vehicle M, and the like. The vehicle sensor 70 may include an outside air temperature sensor that detects an outside air temperature.

The driving operator 80, for example, includes an acceleration pedal, a brake pedal, a shift lever, a steering wheel, and other operators. A sensor detecting the amount of an operation or the presence/absence of an operation is installed in each driving operator 80, and a result of the detection is output to the automated driving control unit 100 or one or two units among the running driving force output device 200, the brake device 210, and the steering device 220.

The automated driving control unit 100, for example, includes a first control unit 120, a second control unit 140, and a storage unit 160. Each of the first control unit 120 and the second control unit 140 is realized by a processor such as a central processing unit (CPU) executing a program (software). Some or all of such functional units may be realized by hardware (a circuit unit; including circuitry) such as a large scale integration (LSI), an application specific integrated circuit (ASIC), a field-programmable gate array (FPGA), or a graphics processing unit (GPU) or may be realized by cooperation between software and hardware. A program may be stored in the storage unit 160 in advance or may be stored in a storage medium such as a DVD or a CD-ROM that can be loaded or unloaded and be installed in the storage unit 160 by loading the storage medium into a drive device. A combination of an external system recognizing unit 121 and a subject vehicle position recognizing unit 122 is one example of a "recognition unit."

The first control unit 120, for example, includes the external system recognizing unit 121, the subject vehicle position recognizing unit 122, and an action plan generating unit 123.

The external system recognizing unit 121 recognizes states of surrounding vehicles such as positions, speeds, and accelerations on the basis of information input from the camera 10, the radar device 12, and the finder 14 through the object recognizing device 16. The position of a surrounding vehicle may be represented as a representative point on the surrounding vehicle such as the center of gravity, a corner, or the like and may be represented by an area represented by the contour of the surrounding vehicle. The "state" of a surrounding vehicle may include an acceleration or a jerk or is an "action state" (for example, the vehicle is changing lanes or is to change lanes) of the surrounding vehicle. The external system recognizing unit 121 may recognize positions of a guard rail, a telegraph pole, a parked vehicle, a pedestrian, and other objects in addition to the surrounding vehicles.

The subject vehicle position recognizing unit 122, for example, recognizes a lane (running lane) in which the subject vehicle M is running and a relative position and a posture of the subject vehicle M with respect to the running lane. The subject vehicle position recognizing unit 122 recognizes a running lane, for example, by comparing a pattern (for example, an array of solid lines and broken lines) of a road partition line that is acquired from the second map information 62 with a pattern of the road partition line in the vicinity of the subject vehicle M that is recognized from an image captured by the camera 10. In the recognition, the position of the subject vehicle M acquired from the navigation device 50 and a processing result acquired using the INS may be taken into account.

Figure 2:
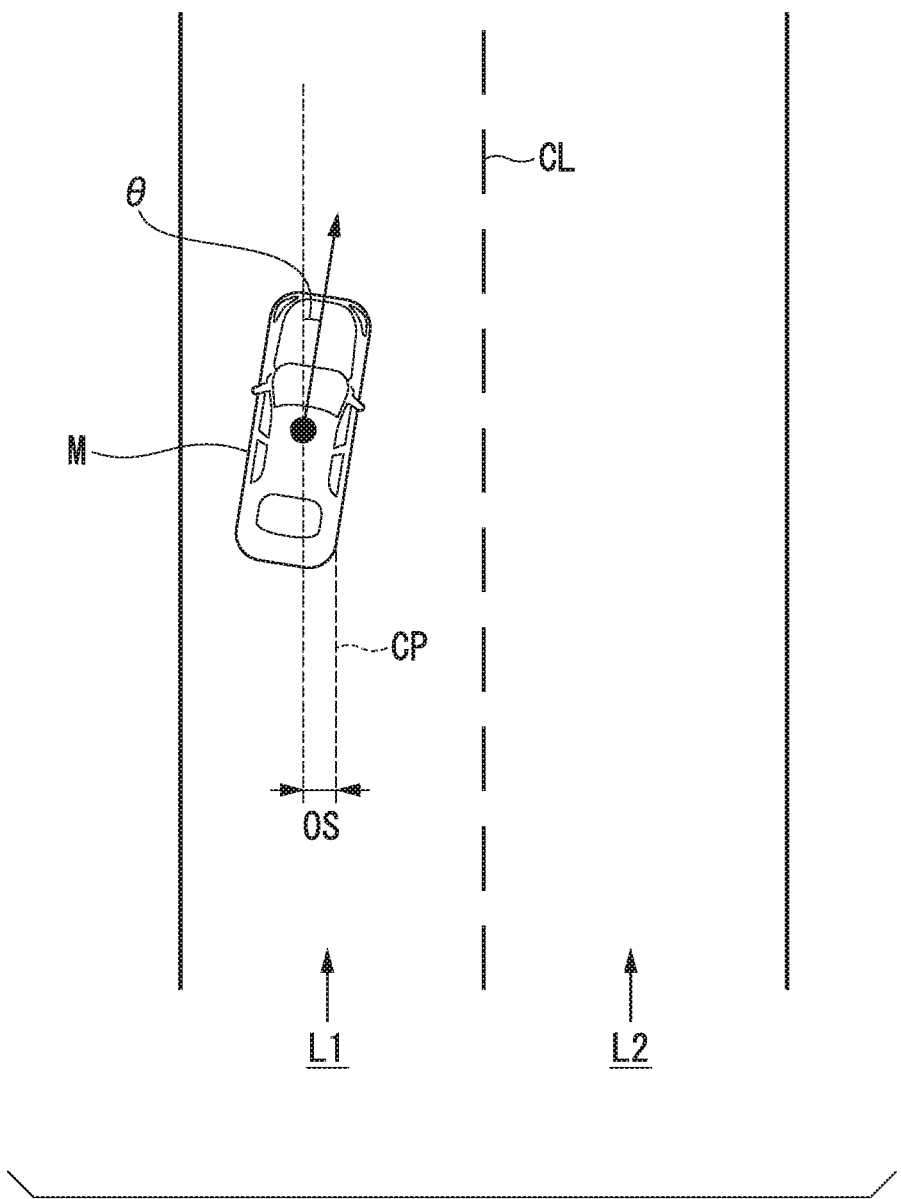
FIG. 2 is a diagram showing a view in which a relative position and a posture of a subject vehicle M with respect to a running lane are recognized by a subject vehicle position recognizing unit.

Then, the subject vehicle position recognizing unit 122, for example, recognizes a position and a posture of the subject vehicle M with respect to the running lane. FIG. 2 is a diagram showing a view in which a relative position and a posture of a subject vehicle M with respect to a running lane L1 are recognized by the subject vehicle position recognizing unit 122. The subject vehicle position recognizing unit 122, for example, recognizes an offset OS of a reference point (for example, center of gravity) of the subject vehicle M from a running lane center CP and an angle θ of a continuation line of the direction of advance of the subject vehicle M with respect to the running lane center CP as a relative position and a posture of the subject vehicle M with respect to the running lane L1. Instead of this, the subject vehicle position recognizing unit 122 may recognize a position of the reference point on the subject vehicle M with respect to one side of its own lane L1 or the like as a relative position of the subject vehicle M with respect to the running lane. The relative position of the subject vehicle M recognized by the subject vehicle position recognizing unit 122 is provided for the recommended lane determining unit 61 and the action plan generating unit 123.

The action plan generating unit 123 determines events to be sequentially executed in automated driving such that the subject vehicle M runs in a recommended lane determined by the recommended lane determining unit 61 and takes into account a surrounding situation of the subject vehicle M. As the events, for example, there are a constant-speed running event in which the subject vehicle runs at a constant speed in the same running lane, a following running event in which the subject vehicle follows a vehicle running ahead, a lane changing event, a merging event, a branching event, an emergency stop event, an handover event for ending automated driving and switching to manual driving, and the like. During the execution of such an event, there are cases in which an action for avoidance is planned on the basis of surrounding situations of the subject vehicle M (the presence/absence of surrounding vehicles and pedestrians, lane contraction according to roadwork, and the like).

The action plan generating unit 123 generates a target locus in which the subject vehicle M will run in the future. The target locus, for example, includes a speed factor. For example, a plurality of reference times in the future are set for each of predetermined sampling times (for example, every a fraction of a [sec]), and the target locus is generated as a set of target positions (locus points) that the subject vehicle will reach at such reference times. For this reason, in a case in which a gap between locus points is large, this represents high-speed running in a section between the locus points.

Figure 3:
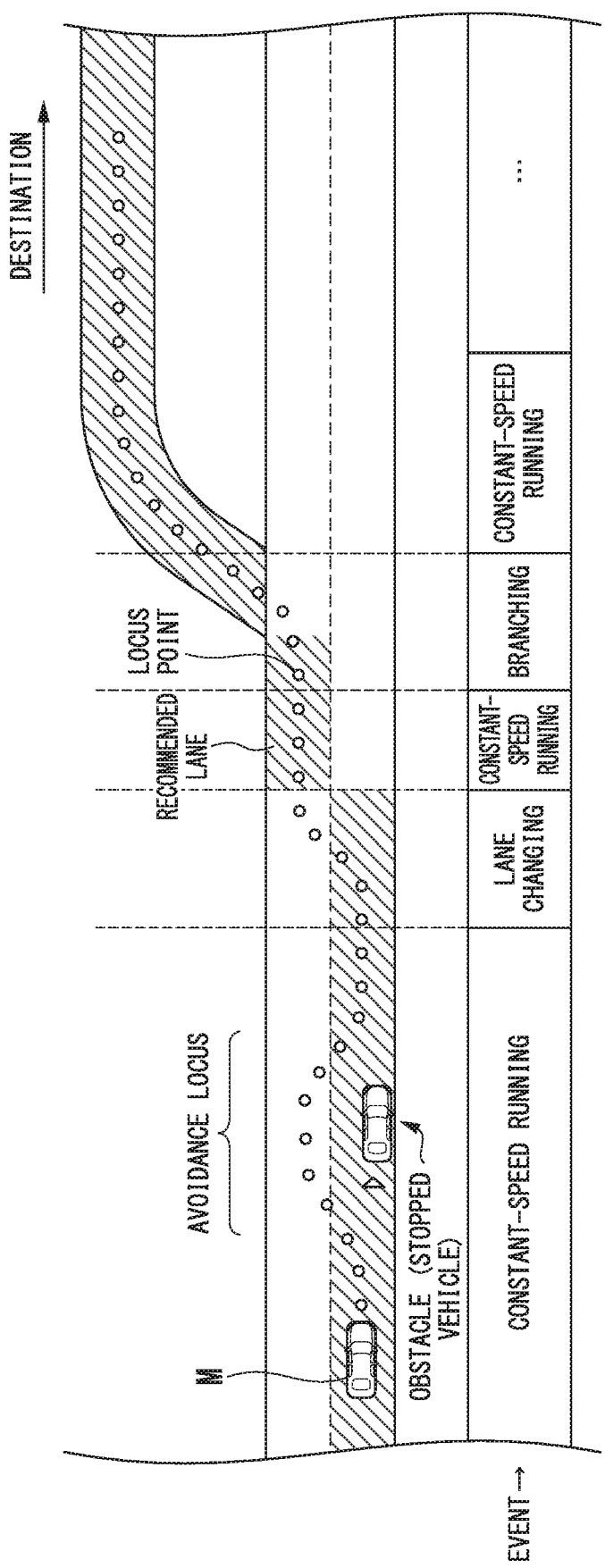
FIG. 3 is a diagram showing a view in which a target locus is generated on the basis of a recommended lane.

FIG. 3 is a diagram showing a view in which a target locus is generated on the basis of a recommended lane. As illustrated in the drawing, the recommended lane is set such that it is convenient for the subject vehicle to run along a route to a destination. When the subject vehicle reaches a position a predetermined distance before a recommended lane switching point (may be determined in accordance with a type of event), the action plan generating unit 123 starts a lane changing event, a branching event, a merging event, or the like. In a case in which there is a need for avoiding an obstacle during the execution of each event, as illustrated in the drawing, an avoidance locus is generated.

The action plan generating unit 123, for example, generates a plurality of candidates for a target locus and selects a target locus that is optimal at that time point on the basis of the viewpoint of efficiency.

An event, for example, is an event that occurs on the basis of the situation outside the subject vehicle M. An event occurring on the basis of the situation outside the subject vehicle M, for example, is an event determined by the action plan generating unit 123 on the basis of a result of the recognition executed by the external system recognizing unit 121 or an event of receiving a request signal to be described later. An action, for example, represents causing the subject vehicle M to generate a predetermined behavior expected in advance by controlling steering of the subject vehicle M or controlling acceleration/deceleration. More specifically, an action when a request signal is received, for example, may be allowing another vehicle to cut in front of the subject vehicle M.

The action plan generating unit 123 generates a running locus of the subject vehicle M in the future on the basis of the positions of other vehicles recognized by the external system recognizing unit 121, the position of the subject vehicle M recognized by the subject vehicle position recognizing unit 122, the running environments of the subject vehicle M or other vehicles, and the like. Details of the function of the action plan generating unit 123 will be described later.

The second control unit 140 includes a running control unit 141. The running control unit 141 controls the running driving force output device 200, the brake device 210, and the steering device 220 such that the subject vehicle M passes along a target locus generated by the action plan generating unit 123 at scheduled times.

The storage unit 160, for example, is realized by a nonvolatile storage device such as a read only memory (ROM), an electrically erasable and programmable read only memory (EEPROM), or a hard disk drive (HDD) and a volatile storage device such as a random access memory (RAM) or a register. Various kinds of information used for executing vehicle control according to an embodiment, a result of the execution, and the like are stored in the storage unit 160.

The running driving force output device 200 outputs a running driving force (torque) for allowing a vehicle to run to driving wheels. The running driving force output device 200, for example, includes a combination of an internal combustion engine, an electric motor, a transmission gear, and the like and an ECU controlling such components. The ECU controls the components described above on the basis of information input from the running control unit 141 or information input from the driving operator 80.

The brake device 210, for example, includes a brake caliper, a cylinder delivering hydraulic pressure to the brake caliper, an electric motor generating hydraulic pressure in the cylinder, and a brake ECU. The brake ECU controls the electric motor on the basis of the information input from the running control unit 141 or the information input from the driving operator 80 such that a brake torque corresponding to a braking operation is output to each vehicle wheel. The brake device 210 may include a mechanism that delivers a hydraulic pressure generated in accordance with an operation for a brake pedal included in the driving operator 80 to the cylinder through a master cylinder as a backup. The brake device 210 is not limited to the configuration described above and may be an electronic control-type hydraulic brake device that delivers a hydraulic pressure of the master cylinder to the cylinder by controlling an actuator on the basis of information input from the running control unit 141.

The steering device 220, for example, includes a steering ECU and an electric motor. The electric motor, for example, changes the direction of the steering wheel by applying a force to a rack and pinion mechanism. The steering ECU changes the direction of the steering wheel by driving the electric motor in accordance with information input from the running control unit 141 or information input from the driving operator 80.

[Details of Action Plan Generating Unit]

Figure 4:
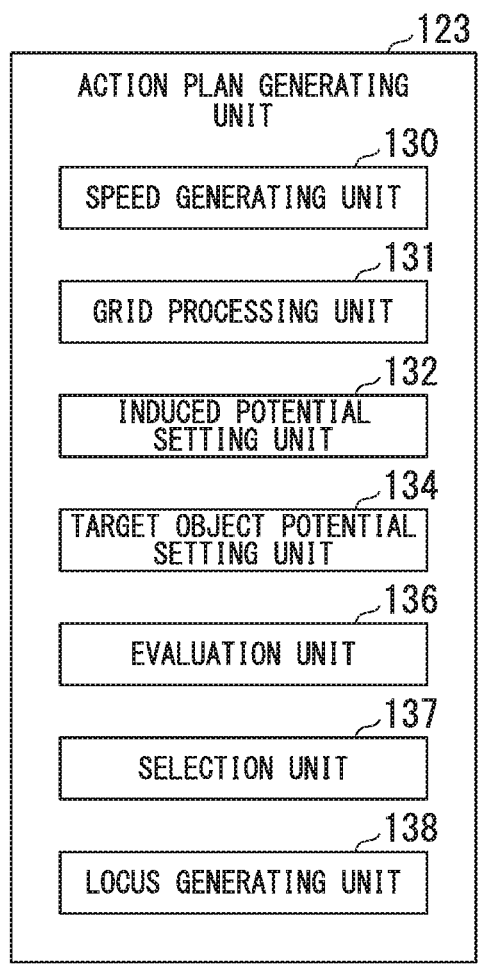
FIG. 4 is a functional configuration diagram of an action plan generating unit.

Next, details of the function of the action plan generating unit 123 will be described. FIG. 4 is a functional configuration diagram of the action plan generating unit 123. The action plan generating unit 123, for example, includes a speed generating unit 130, a grid processing unit 131, an induced potential setting unit 132, a target object potential setting unit 134, an evaluation unit 136, a selection unit 137, and a locus generating unit 138. The target object potential setting unit 134 is one example of a "potential setting unit."

The speed generating unit 130, for example, generates a current or future speed (target speed) of the subject vehicle M on the basis of a result of the recognition executed by the external system recognizing unit 121. The speed is arbitrarily set not to exceed a legal speed limit.

The grid processing unit 131 assumes a coordinate system (i, j) having a direction along the longitudinal direction of a road (advancement direction) and a direction along the widthwise direction of the road (horizontal direction) as its axes for a road surface area in front of the subject vehicle M and virtually sets grid squares G acquired by partitioning the road surface area with a predetermined width in two directions.

Figure 5:
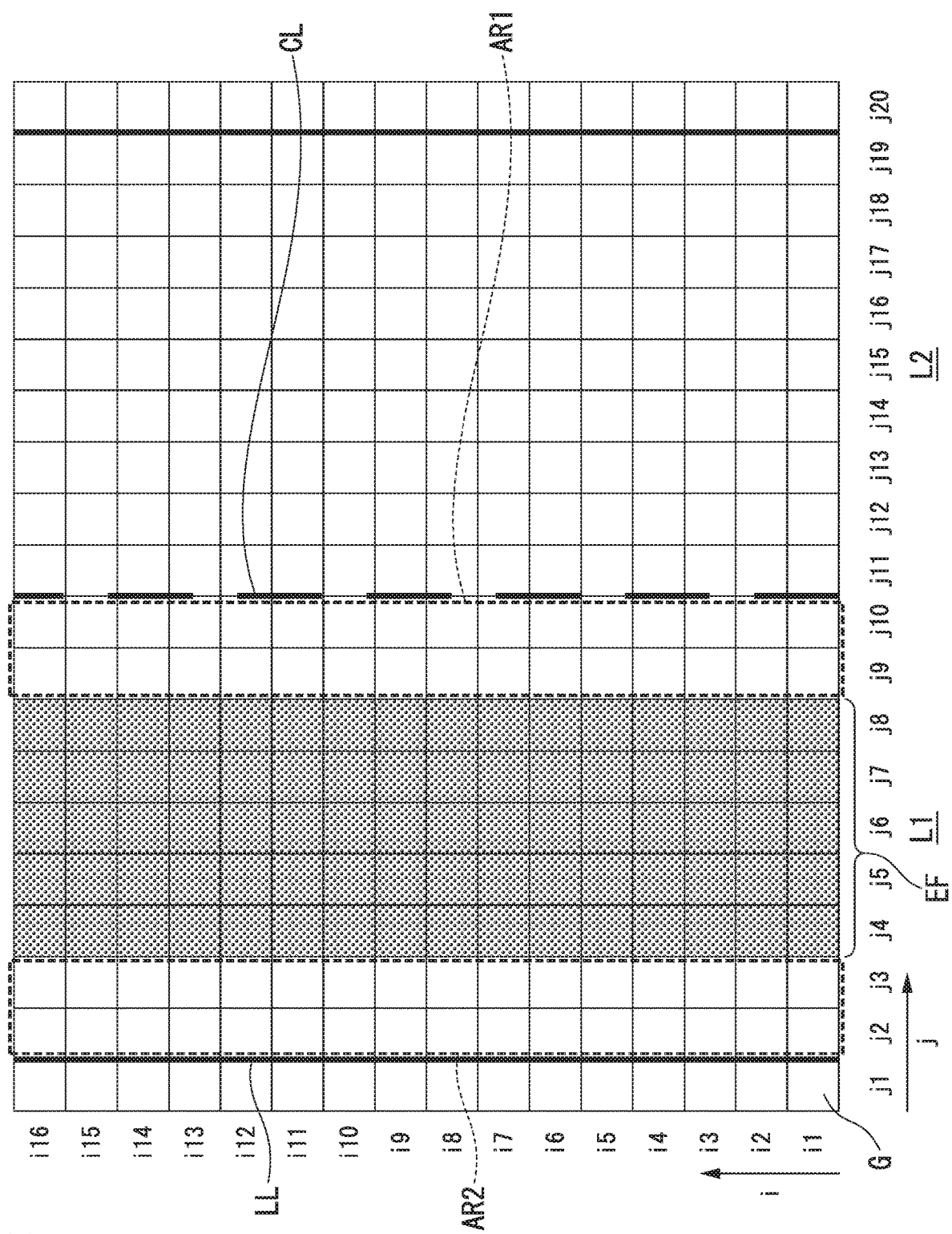
FIG. 5 is a diagram showing one example of grid squares set in a road surface area.

FIG. 5 is a diagram showing one example of grid squares G set in a road surface area. In the example illustrated in FIG. 5, a road of two lanes on each side is illustrated. In the example illustrated in FIG. 5, for the simplicity of description, a straight road is illustrated. The partition width of grid squares G may be set as either being the same as or being different from each other in a horizontal direction with respect to the advancement direction. The grid squares G do not need to be set as having a lattice form and may be set in any of different forms such as a honeycomb. The shape of each of the grid squares G is not limited to a rectangle and may be a circle or any other polygon. Although a straight road is illustrated for the simplification of description in FIG. 5, a similar process can be performed also for a curved road through a specific conversion process.

The grid processing unit 131 sets an effective area that is an evaluation target of the evaluation unit 136. Here, the effective area is assumed to be set with being limited to the inside of one lane. The effective area, for example, may be set as being within an effective area EF acquired by excluding an area AR1 near a road partition line CL and an area AR2 near a left road partition line LL from a running lane L1 as illustrated in the drawing. The effective area EF, for example, is an area set such that at least a part of the subject vehicle M does not overlap the road partition line CL or LL in a case that a representative point (for example, the center of gravity) of the subject vehicle M enters the inside of the effective area EF.

The induced potential setting unit 132 sets an induced potential Pi on the basis of the road area. The induced potential Pi, for example, is an index value set for an area on a road on the basis of the presence of an object (a road partition line, a guard rail, a median strip, a road shoulder line, or the like) partitioning the road.

Figure 6:
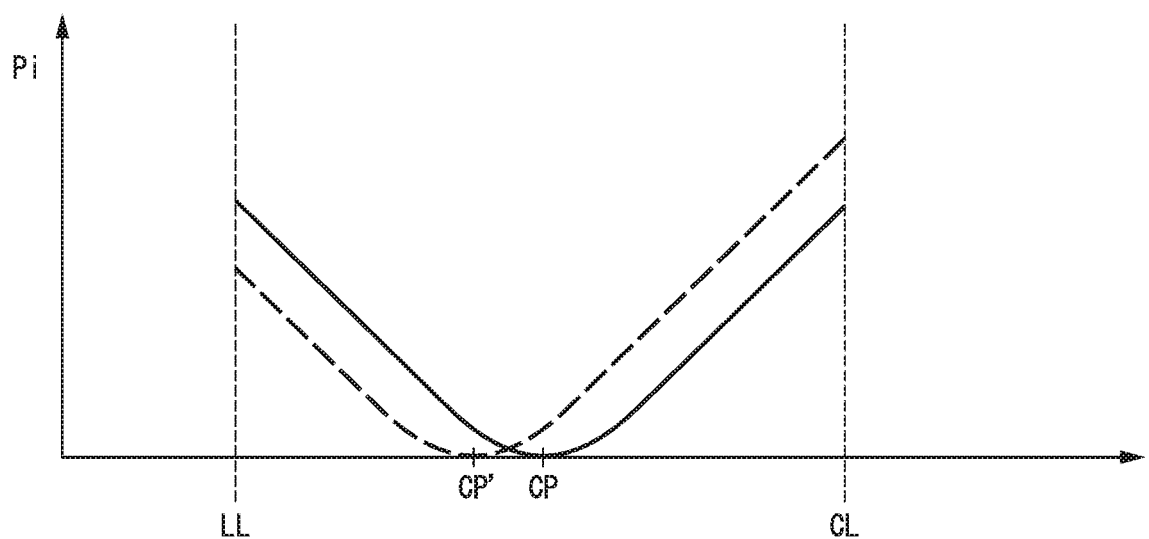
FIG. 6 is a diagram showing one example of an induced potential.

FIG. 6 is a diagram showing one example of the induced potential Pi. A vertical axis represents the induced potential Pi, and a horizontal position represents a position in a lane. The induced potential Pi is an index value having a characteristic inducing the subject vehicle M to a side having a lower value. The value of the induced potential Pi, for example, as denoted by a solid line illustrated in FIG. 6, is set as being higher in a case that the position is located farther from the running lane center CP.

In a case in which a running road is a curved road, the induced potential setting unit 132 may offset the induced potential Pi by a predetermined distance in a direction away from an opposing lane (the road partition line LL side). In such a case, for example, as denoted by a dotted line illustrated in FIG. 6, the value of the induced potential Pi is set as being lowest at a position CP' offset from the running lane center CP by a predetermined distance and is set as increasing as the position becomes farther therefrom. Particularly, an oncoming vehicle running in an opposing lane has a high relative speed, and thus, in a case in which a running road is a curved road, the induced potential Pi is offset in a direction away from the opposing lane before the opposing vehicle is recognized by the object recognizing device 16. Accordingly, in a case in which the subject vehicle is running on a curved road, the running position of the subject vehicle M can be shifted in a direction away from the opposing lane, and thus, contact with the oncoming vehicle running in the opposing lane can be easily avoided.

The target object potential setting unit 134 sets a target object potential Po on the basis of a surrounding situation of the subject vehicle M in the future. The target object potential Po, for example, is an index value that is set for each surrounding object recognized by the external system recognizing unit 121. The target object potential is an index value having a characteristic inducing the subject vehicle M to a lower value side. The target object potential, for example, is set such that it decreases as the position becomes farther from an object (for example, another vehicle).

Figure 7:
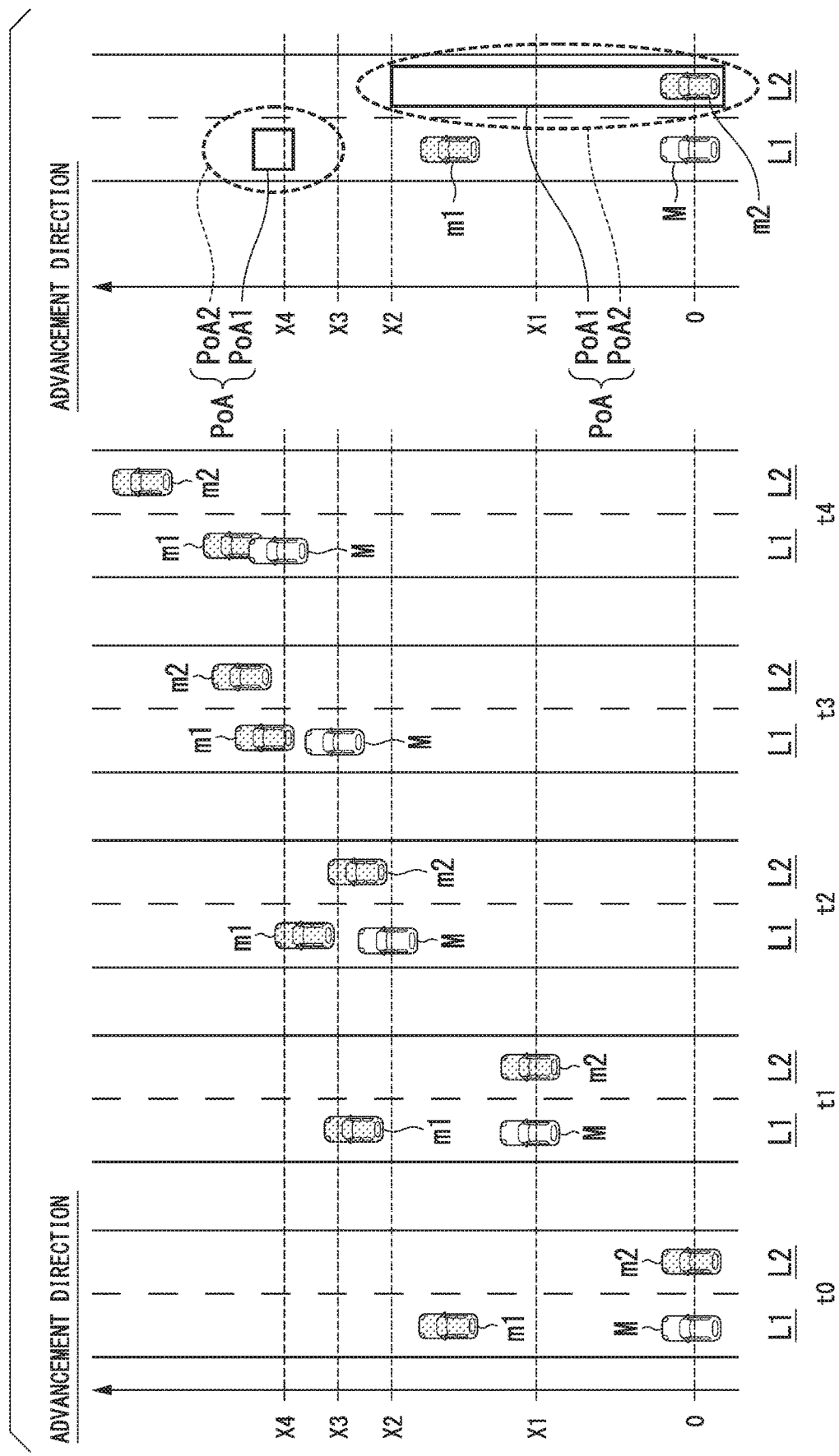
FIG. 7 is a diagram showing a technique for setting a target object potential.

FIG. 7 is a diagram showing a technique for setting a target object potential Po. The illustrated example illustrates a scene in which the target object potential setting unit 134 sets a target object potential Po at a time t0. For example, at the time t0, another vehicle m1 is running in front of a subject vehicle M in a running lane L1 of the subject vehicle M, and another vehicle m2 is running in an adjacent lane L2 at a position overlapping with the subject vehicle M in the advancement direction.

The target object potential setting unit 134 predicts positions of the subject vehicle M at times t0 to t4 on the basis of a speed generated by the speed generating unit 130. In the example illustrated in FIG. 7, the subject vehicle M is located at a position 0 (zero) at a time t0, is predicted to proceed to a position x1 at a time t1, is predicted to proceed to a position x2 at a time t2, is predicted to proceed to a position x3 at a time t3, and is predicted to proceed to a position x4 at a time t4. The target object potential setting unit 134 predicts the positions of the other vehicles m1 and m2 at the times t1 to t4 on the basis of the behaviors of the other vehicles m1 and m2 at the time t0 and previous times. The positions of vehicles at the times t1 to t4 illustrated in FIG. 7 are prediction result of the positions of the subject vehicle M and the other vehicles m1 and m2.

The target object potential Po relating to the another vehicle m1 will be described. For example, the subject vehicle M is predicted to overtake the another vehicle m1 at the time t4. Thus, the target object potential setting unit 134 sets an area including a surrounding area PoA2, which has an area PoA occupied by the another vehicle m1 at the time at which the subject vehicle M overtakes the another vehicle m1 (or a time slight before the time) as its center, as a target object potential area PoA. The target object potential area PoA is an area representing a distribution of the target object potential Po.

Figure 8:
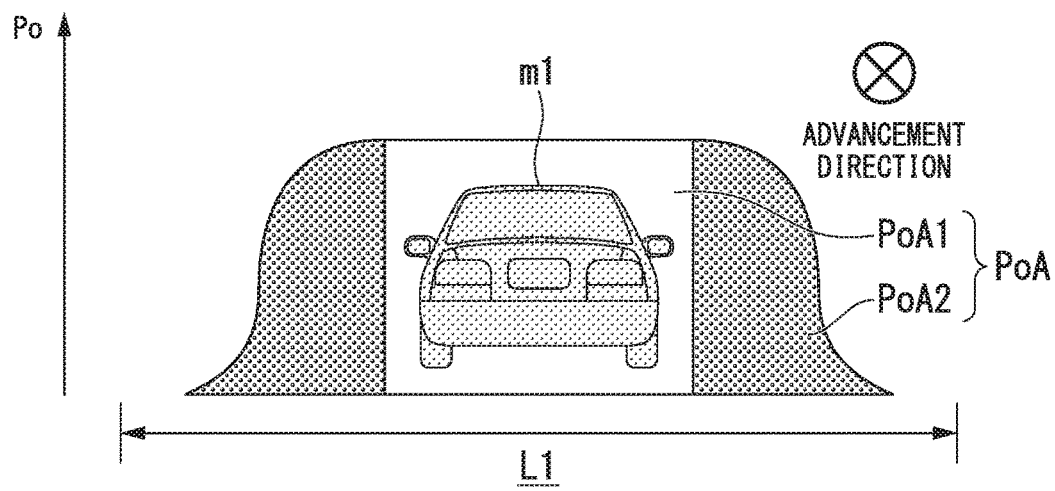
FIG. 8 is a diagram showing a view in which a target object potential area set in another vehicle is seen from behind the other vehicle.

FIG. 8 is a diagram showing a view in which a target object potential area PoA set in another vehicle m1 is seen behind the another vehicle m1. A height at each coordinates of the target object potential area PoA illustrated in FIG. 8 represents the magnitude of the target object potential Po. For example, the target object potential Po is set as being the highest in an area PoA1 corresponding to the position of the another vehicle m1 and is set as being gradually lowered as the position is separated away from the area PoA1. In this case, the target object potential setting unit 134 sets the magnitude of the target object potential Po based on a distance from the area PoA1 using a predetermined function or the like. The target object potential setting unit 134 may set the magnitude of the target object potential Po in a stepped manner in accordance with a distance from the area PoA1.

The target object potential Po for the another vehicle m2 will be described. At each time point of a time t0 to a time t2, at least a part of the subject vehicle M is predicted to overlap the another vehicle m2 in the advancement direction. The target object potential setting unit 134 sets the target object potential Po with an area occupied by a position history of the another vehicle m2 at a period of a time at which the horizontal positions of the subject vehicle M and the another vehicle m2 overlap each other (or a period of a time set as being slightly longer than that) as its center.

Figure 9:
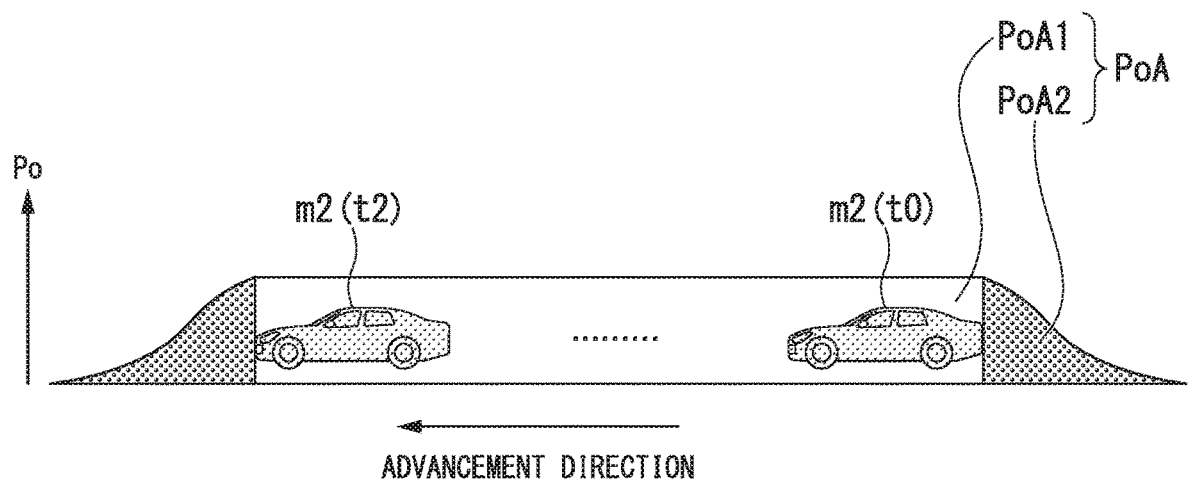
FIG. 9 is a diagram showing a view in which a target object potential area set by another vehicle is seen from the side.
Figure 10:
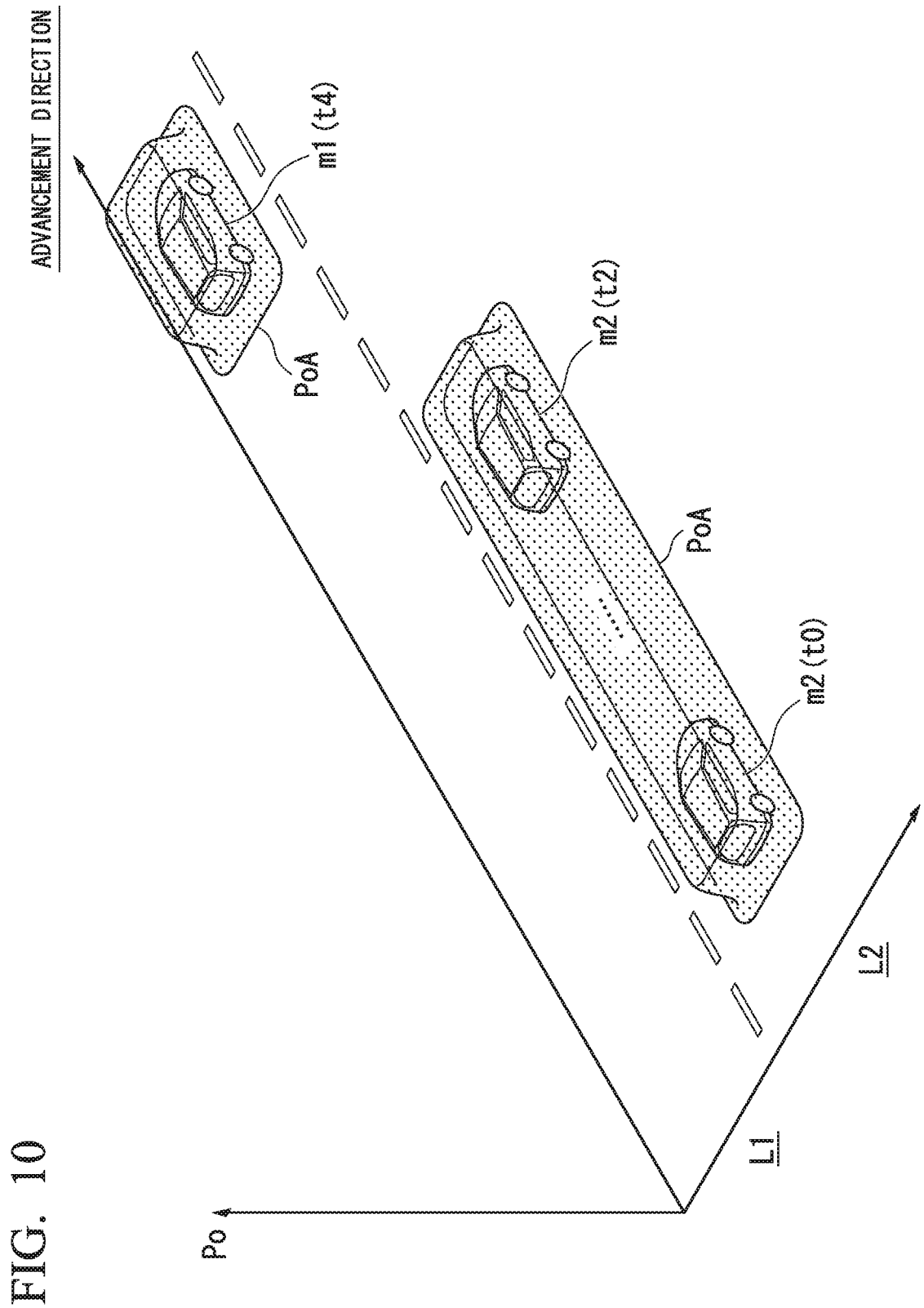
FIG. 10 is a diagram schematically three-dimensionally showing a target object potential area set in a scene illustrated in FIG. 7.

FIG. 9 is a diagram showing a view in which a target object potential area PoA set by another vehicle m2 is seen from the side. A height at each coordinates of the target object potential area PoA illustrated in FIG. 9 represents the magnitude of the target object potential Po. For example, the target object potential Po is set as being the highest in an area PoA1 corresponding to each of positions of the another vehicle m2 at a time t0 to a time t2 and is set as being gradually lowered as the position is separated away from the area PoA1. FIG. 10 is a diagram schematically three-dimensionally showing a target object potential area PoA set in a scene illustrated in FIG. 7. In the drawing, a height direction represents the magnitude of the target object potential Po.

The target object potential setting unit 134 may differently set the target object potential area PoA set in the straight road described above on the basis of whether the subject vehicle M is running in predetermined running environments. Here, the predetermined running environments, for example, are the shape of a lane in which the subject vehicle M or another vehicle runs, the running state of another vehicle, presence/absence of an obstacle on a lane, presence/absence of recognition of a road partition line, and the like. The shape of a lane, for example, is a curved road, an "S"-shaped road, an advancement direction or an inclination of the horizontal direction with respect to the advancement direction, or a change in the road width. The running state of another vehicle, for example, is a state in which another vehicle runs with being drawn to the road partition line side.

Figure 11:
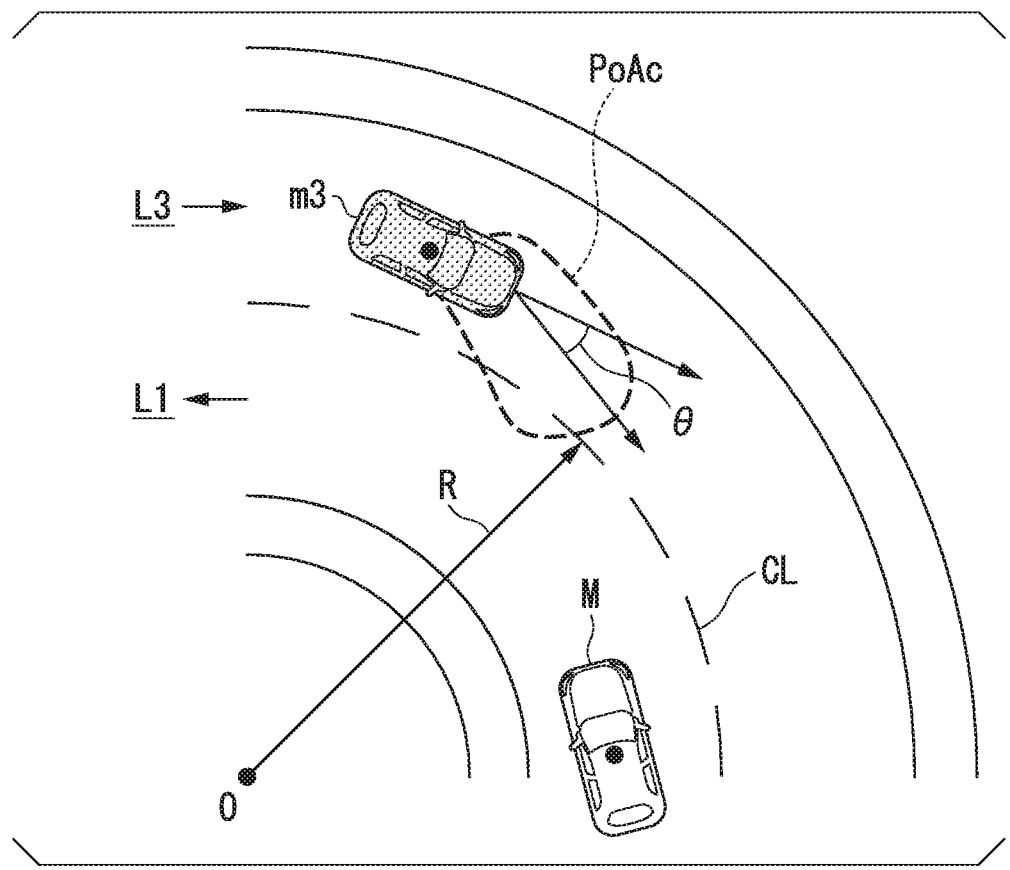
FIG. 11 is a diagram showing a relation between a subject vehicle M and another vehicle running on a curved road.

FIG. 11 is a diagram showing a relation between a subject vehicle M and another vehicle m3 running on a curved road. In the example illustrated in FIGS. 11 to 14, a running lane L1 is assumed to be one lane, and a lane L3 is assumed to be an opposing lane. In a case in which the running lane of the subject vehicle M or another vehicle m3 is a curved road, the target object potential setting unit 134 sets a target object potential area PoAc acquired by changing the target object potential area PoA set in the straight road described above on the basis of a radius of curvature R of the curved road. In the example illustrated in FIG. 11, the reason why the target object potential area PoAc extends near the front side of another vehicle m3 is that there is a high likelihood of being in contact in front of the another vehicle m3 on the basis of a relation between the advancement direction of the subject vehicle M and the advancement direction of the another vehicle m3. The radius of curvature R, for example, may be set with reference to a road partition line between lanes or may be set with reference to the center of a lane.

Figure 12:
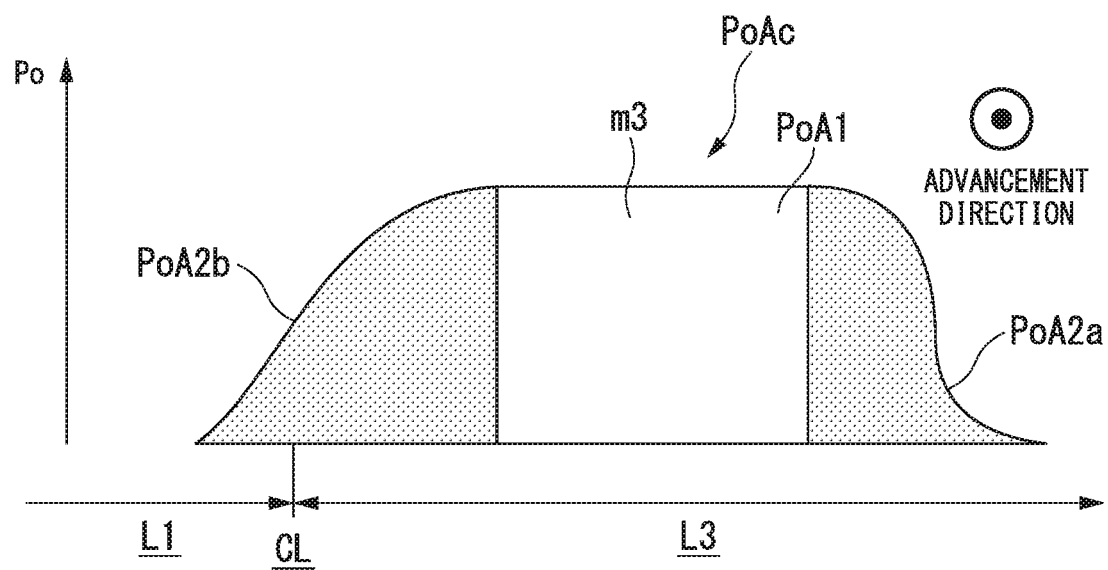
FIG. 12 is a diagram showing a view in which a target object potential area in a curved road that is set in another vehicle is seen in front of the another vehicle.

FIG. 12 is a diagram showing a view in which a target object potential area PoAc in a curved road that is set in another vehicle m3 is seen in front of the another vehicle m3. A height at each coordinates of the target object potential area PoAc illustrated in FIG. 12 represents the magnitude of the target object potential Po. The target object potential setting unit 134 sets a target object potential Po such that it is the highest in an area PoA1 showing the position of another vehicle m1 and is gradually lowered as the position is separated away from the area PoA1. Here, a steering angle θ of the steering wheel of the another vehicle m3 is predicted to change to the subject vehicle M side in accordance with the radius of curvature R of the lane L3. Accordingly, the target object potential setting unit 134 adjusts the magnitude of the target object potential Po in a direction approaching the lane L1 side to be larger than the target object potential Po in a direction away from the subject vehicle M by using the area PoA1 as a reference. In other words, a target object potential area PoA2*b* of the lane L1 side using the another vehicle m3 illustrated in FIG. 12 as a reference is larger than a target object potential area PoA2*a* of a side opposite to the lane L1 that is set at the time of running in a straight road.

The target object potential setting unit 134 may adjust the target object potential area PoAc for the radius of curvature R using a predetermined function or the like and may adjust the target object potential area PoAc in a stepped manner on the basis of a distance from the area PoA1. The target object potential setting unit 134 may increase the degree of change of the target object potential area PoAc as the radius of curvature R further decreases (as the curvature further increases or forms a sharper curve).

The target object potential setting unit 134 may change the degree of change in the target object potential Po on the basis of the curvature of a curved road. In this case, the target object potential setting unit 134 sets the target object potential area PoAc of a case in which the subject vehicle M or another vehicle m3 runs a curved road having a predetermined radius of curvature or more (in other words, the radius of curvature R is a predetermined value or less) as being larger than the target object potential area PoA of a case in which the subject vehicle or another vehicle m3 is not running on a curved road having a predetermined curvature or more.

In this way, by adjusting the target object potential area on the basis of the radius of curvature R of the running lane L3 of the another vehicle m3, in a case in which a high likelihood of another vehicle's trespassing of the road partition line CL is predicted, the target object potential area PoA is adjusted. Accordingly, a more appropriate running locus is generated, and the subject vehicle can run along the generated running locus.

Figure 13:
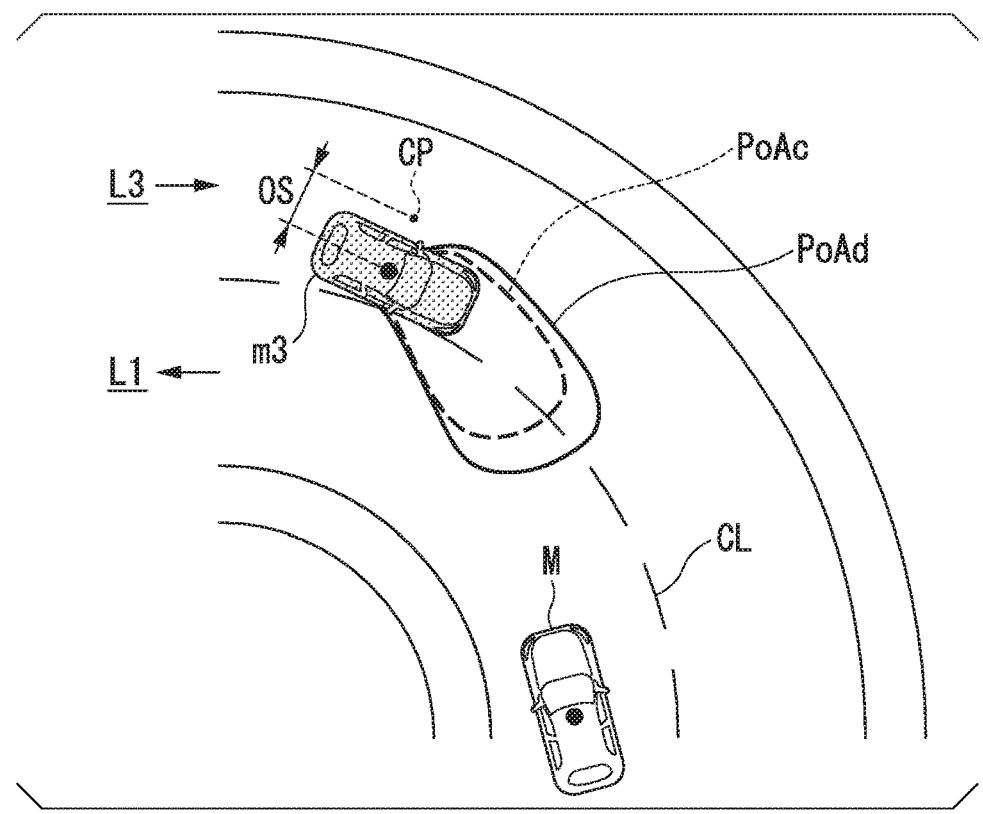
FIG. 13 is a diagram showing setting of a target object potential area in a case in which another vehicle runs on a road partition line in a lane.

FIG. 13 is a diagram showing setting of a target object potential area PoAd of a case in which another vehicle m3 runs on a road partition line CL in a lane L3. For example, in a case in which a subject vehicle M runs with being drawn to a road partition line CL that partitions the running lane L1 of the subject vehicle M and the running lane L3 of another vehicle m3, the target object potential setting unit 134 sets a target object potential area PoAd that is acquired by further enlarging the target object potential area PoAc. In such a case, the target object potential setting unit 134 may adjust the degree of change in the target object potential area PoAd with respect to the target object potential area PoAc in accordance with the magnitude of an offset OS from the center CP of the lane L3 of the subject vehicle M.

Figure 14:
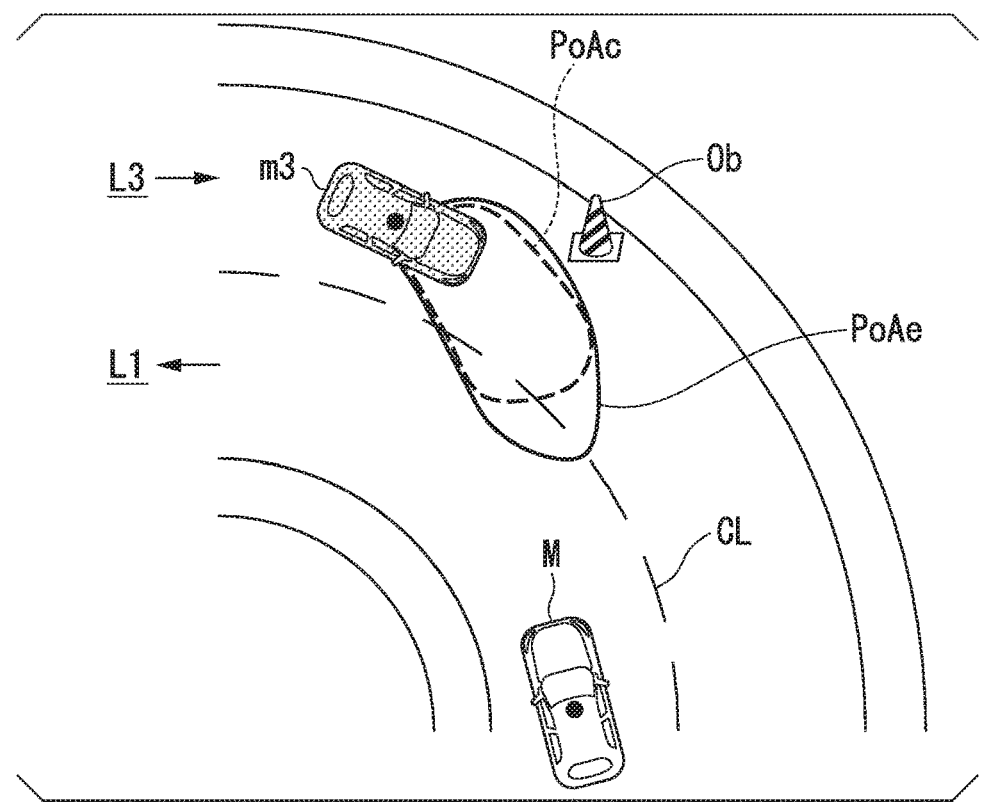
FIG. 14 is a diagram showing setting of a target object potential area of a case in which an obstacle is detected in an advancement direction of another vehicle.

FIG. 14 is a diagram showing setting of a target object potential area PoAe of a case in which an obstacle Ob is detected in an advancement direction of another vehicle m3. Here, the obstacle Ob, for example, is a color cone (registered trademark), a telegraph pole, a guard rail, a parked vehicle on a road, a pedestrian, or any other object.

For example, in a case in which there is an obstacle Ob in the advancement direction of another vehicle m3, there is a high likelihood that the another vehicle m3 enters the lane L1 side for avoiding the obstacle Ob. For this reason, in a case in which an obstacle Ob is recognized in the advancement direction of the another vehicle m3 by the external system recognizing unit 121, the target object potential setting unit 134 predicts that there is a high likelihood of a change in the behavior of the another vehicle m3 and sets a target object potential area PoAe different from the target object potential area PoAc in a case in which a high likelihood of a change in the behavior is predicted. In such a case, the target object potential setting unit 134 may change the shape of the target object potential area PoAe on the basis of the speed and the position of the subject vehicle M or the another vehicle m3 or the position and the size of the obstacle Ob. Accordingly, the target object potential area PoAe can be set in accordance with the position and the behavior of the another vehicle m3.

Figure 15:
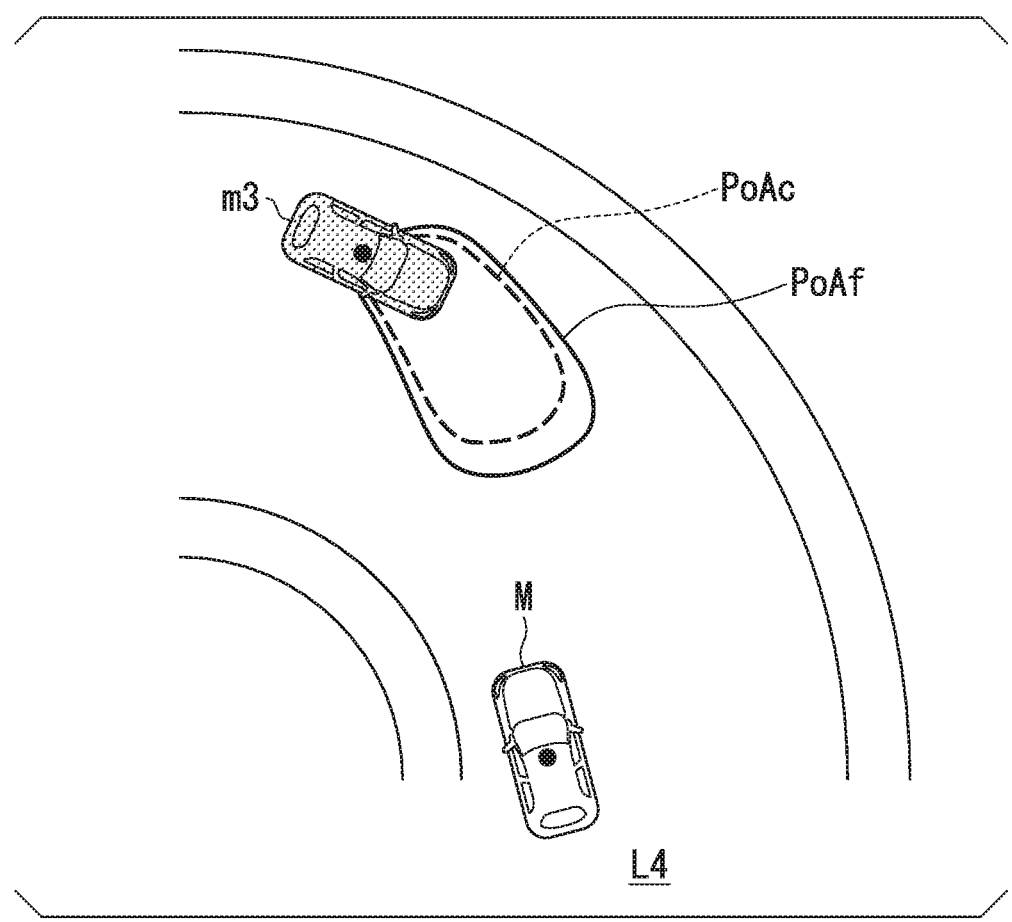
FIG. 15 is a diagram showing setting of a target object potential area of a case in which a road partition line between a running lane and an opposing lane cannot be recognized.

FIG. 15 is a diagram showing setting of a target object potential area PoAf of a case in which a road partition line between a running lane and an opposing lane cannot be recognized. A case in which a road partition line between a running lane and an opposing lane cannot be recognized, for example, is a case in which the road partition line cannot be recognized from an image captured by the camera 10. Examples of the case in which a road partition line cannot be recognized from an image include a case in which a road partition line to be normally present disappears or blurs and a case in which there is originally no road partition line due to a narrow road such as an alley. In the example illustrated in FIG. 15, a lane L4 in which there is originally no road partition line is illustrated.

For example, in a case in which a subject vehicle M and another vehicle m3 oppositely run with respect to a lane L4, it is predicted that the subject vehicle m3 runs on the subject vehicle M side. Accordingly, in a case in which a road partition line between a running lane and an opposing lane cannot be recognized, the target object potential setting unit 134 sets a target object potential area PoAf that is wider than the target object potential area PoAc. The wider target object potential area, for example, may be an area acquired by enlarging the target object potential area PoAc as a reference at a predetermined ratio or an area acquired by extending the target object potential area in an advancement direction of the another vehicle m3 or a horizontal direction with respect to the advancement direction. In this way, a target object potential area PoA that is appropriate for the running lane state can be set.

The target object potential setting unit 134 may change the target object potential area PoA in a case in which a road surface state of the running lane is an off road, a slip road, or the like. The road surface state, for example, may be acquired from climate information that is acquired from an external device through the communication device 20, the temperature of outside air included in the vehicle sensor 70, and the like. For example, in a case in which the climate is rain or snow, and the temperature of the outside air is equal to or lower than a predetermined temperature, it is predicted a vehicle may easily slip due to a frozen road surface, and thus, the target object potential setting unit 134 enlarges the target object potential area PoA.

The evaluation unit 136 derives an index value acquired by evaluating the potential of a grid square of interest among a plurality of grid squares (separate areas) on the basis of the induced potential Pi and the target object potential Po set in the grid square of interest (a separate area of interest) and prediction information generated for surrounding grid squares (surrounding separate area) selected from the surroundings of the grid square of interest. The prediction information, for example, is information generated on the basis of the status of the subject vehicle M in the future that is predicted from the current status of the subject vehicle M and the status of surroundings of the subject vehicle M and is set on the basis of the induced potential Pi and the target object potential Po set for surrounding grid squares. The surrounding grid squares (grid squares that are targets for prediction information), for example, are a predetermined number of grid squares extending in one direction or both directions out of the advancement direction of the grid square of interest and the widthwise direction of the subject vehicle M. For example, the surrounding grid squares include grid squares extending on a further front side of the subject vehicle M in the advancement direction than the grid square of interest in the advancement direction of the subject vehicle M. The surrounding grid squares, for example, may be determined on the basis of the running state of the subject vehicle M. For example, the surrounding grid squares are grid squares corresponding to a distance acquired by multiplying the running speed of the subject vehicle M by a predetermined time (for example, several seconds).

Figure 16:
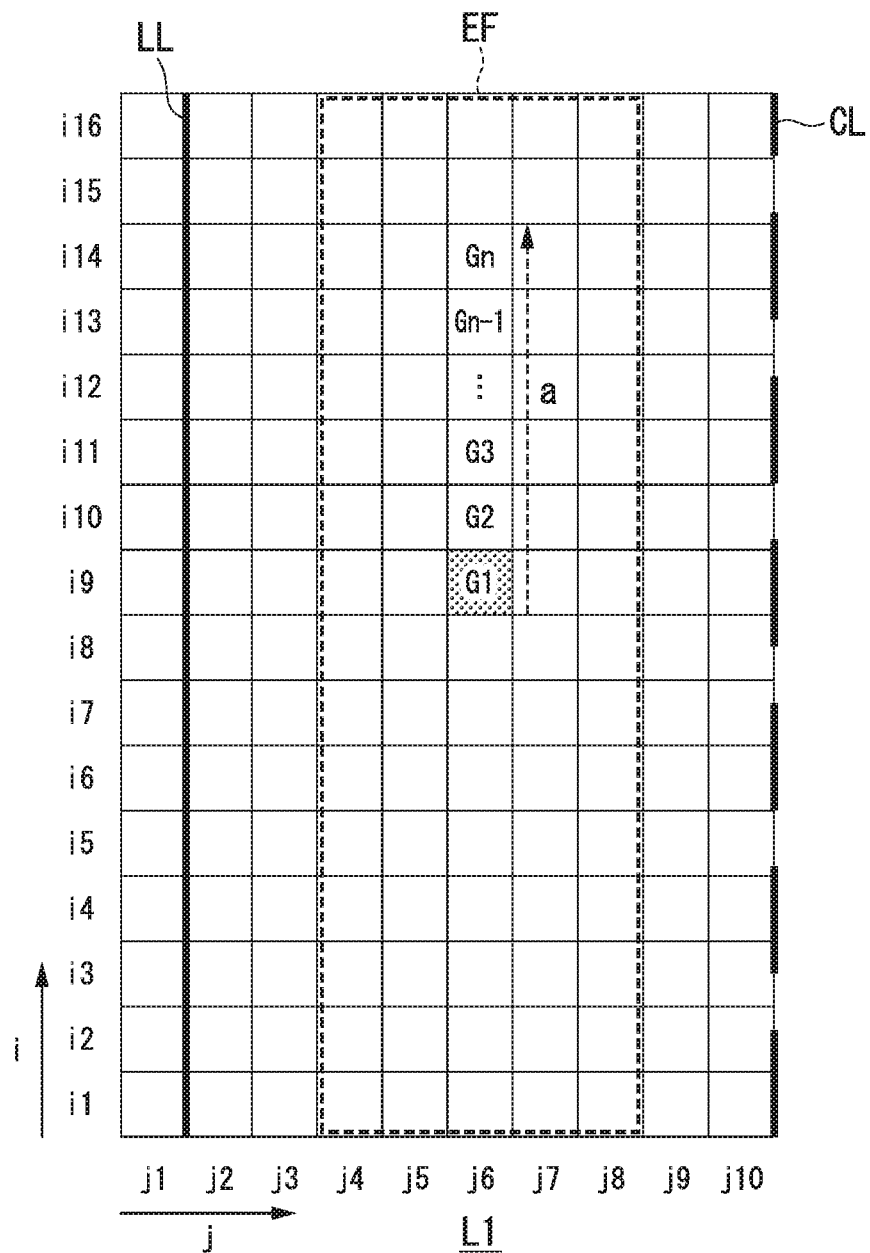
FIG. 16 is a diagram showing the deriving of index values.

Next, the evaluation unit 136 derives an index value for each grid square G included in the effective area EF. FIG. 16 is a diagram showing the deriving of index values. For example, a grid square G1 will be assumed as the grid square of interest. The evaluation unit 136, for example, derives an integrated potential on the basis of the induced potential Pi and the target object potential Po set in the grid square G1. The integrated potential may be an index acquired, for example, by adding, weighting, multiplying the induced potential Pi and the target object potential Po and may be an index value derived by inputting the induced potential Pi and the target object potential Po to a predetermined function or the like.

Next, the evaluation unit 136 derives an integrated index value of the grid square G1 on the basis of the integrated potential of the grid square G1 and the prediction information. In the example illustrated in FIG. 16, the prediction information, for example, is information acquired by integrating the induced potential Pi and the target object potential Po set in each of grid squares G2 to Gn. The integrated information, for example, is an integrated potential that is derived, similar to the grid square G1, for each of the grid squares G2 to Gn. Hereinafter, this will be referred to as predicted index value.

In a case that the predicted index value is derived, the evaluation unit 136 may perform multiplication using a weighting factor that decreases as the position is located farther from the grid square G1 of interest. For example, the integrated index value is derived on the basis of the following Equation (1).

$$Q_{i,j} = \sum_{m=i}^{\alpha} \sum_{n=j-\frac{\beta}{2}}^{j+\frac{\beta}{2}} q(m, n) \tag{1}$$

Here, "Q" represents an integrated index value of the grid square G of interest, "i" represents coordinates of the grid square of interest in the advancement direction, "j" represents coordinates of the grid square of interest in the widthwise direction, "α" represents a range of a target of prediction information in the advancement direction, and "β" represents a range of the target of the prediction information in the widthwise direction. Although Equation (1) represents that the range that is the target of the prediction information in the widthwise direction can be arbitrarily set, in the example illustrated in FIG. 16, β is set to have a value corresponding to one grid square.

In this case, regarding the surrounding grid squares, the number of grid squares selected along the advancement direction (direction i) of the subject vehicle M may be larger than the number of grid squares selected along the widthwise direction (direction j) of the subject vehicle M.

The induced potential Pi, the target object potential Po, the integrated potential, and the like may be acquired also for each of grid squares G disposed in an area other than the effective area EF. In this way, index values can be derived with a high accuracy also for grid squares G of end portions of the effective area EF on the advancement direction side. In a case that index values are derived for grid squares G of the end portion of the effective area EF in the advancement direction side, the index values of the grid squares G of the end portions may be derived using a value set in advance.

Figure 17:
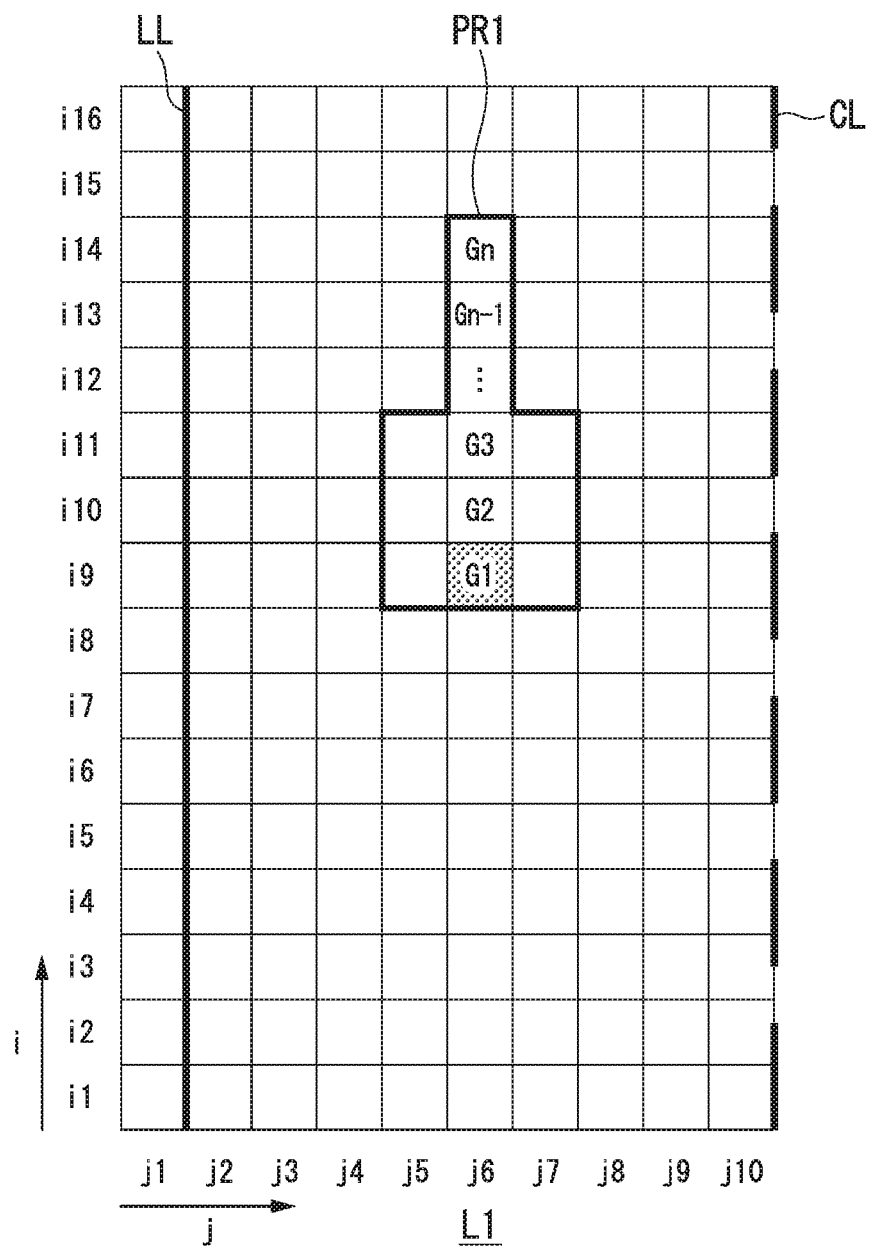
FIG. 17 is a diagram showing another example of surrounding grid squares.

The surrounding grid squares, as illustrated below, may have a range of a shape other than a rectangle, a circle, and an oval as its target and are not limited to a range of a square or a rectangle and may have a range of a polygon as its target. FIG. 17 is a diagram showing another example of surrounding grid squares. The surrounding grid squares, for example, may be in a range PR1 including "n (here, n is an arbitrary natural number)" grid squares G in the advancement direction and "k (here, k is an arbitrary natural number)" grid squares G in the widthwise direction for a grid square G of interest. For example, in a case in which the grid square G1 is a grid square of interest, surrounding grid squares may be in a range PR1 including "n (here, n is a natural number)" grid squares G2 to Gn in the advancement direction for the grid square G1 of interest and a grid square G adjacent to the grid square G1 in the widthwise direction and further including two grid squares G extending in the advancement direction for the adjacent grid square G.

Referring back to FIG. 4, the selection unit 137 selects one or more grid squares in the advancement direction of the subject vehicle M from a plurality of grid squares inside the effective area EF on the basis of the integrated index values derived by the evaluation unit 136.

The locus generating unit 138 generates a future target locus of the subject vehicle M on the basis of one or more grid squares along the advancement direction of the subject vehicle M that are selected by the selection unit 137.

Figure 18:
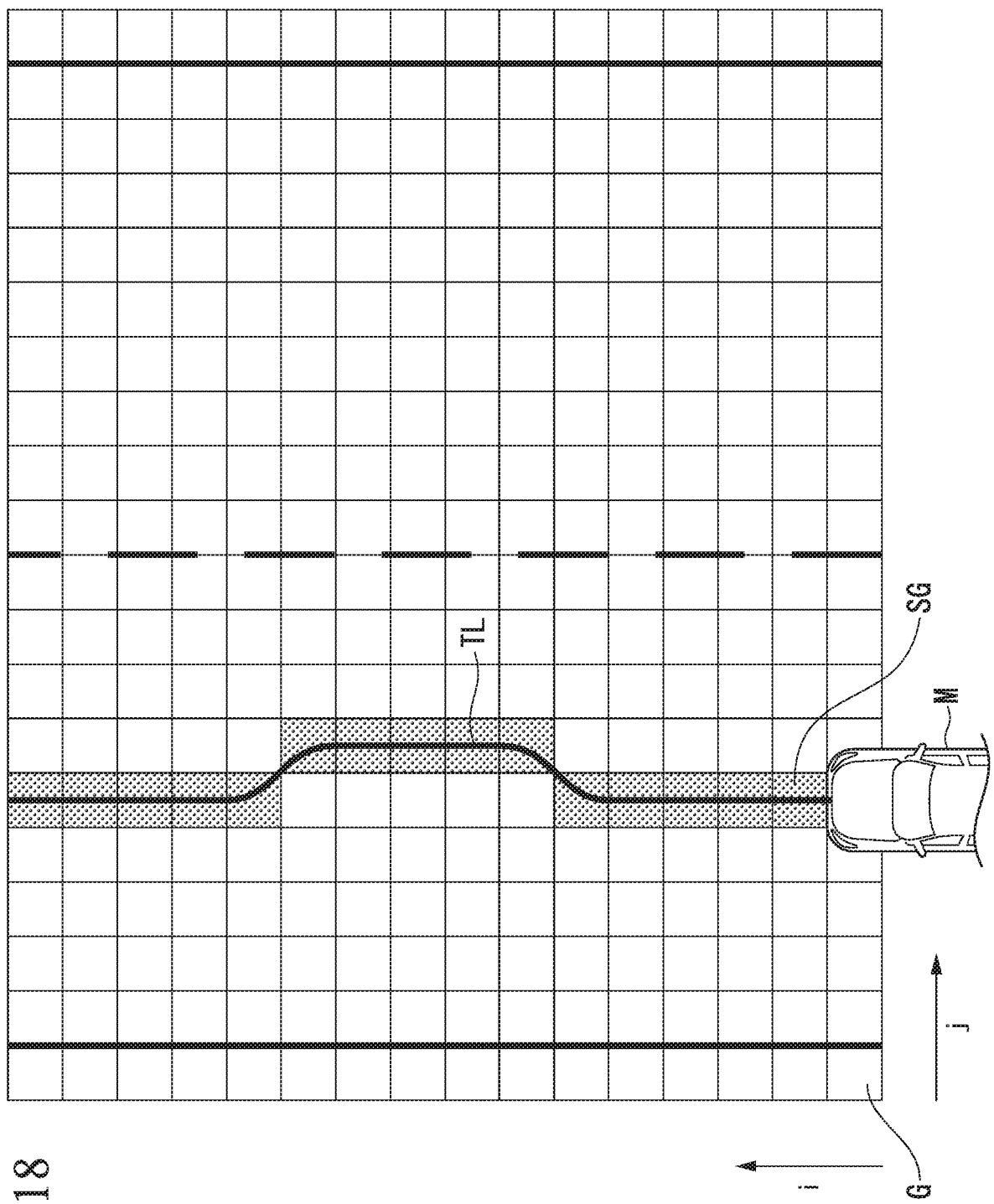
FIG. 18 is a diagram showing selected grid squares selected by a selection unit and a target locus generated on the basis of the selected grid squares.

FIG. 18 is a diagram showing selected grid squares SG selected by the selection unit 137 and a target locus TL generated on the basis of the selected grid squares SG. The selection unit 137, for example, selects a grid square G having a smallest integrated index value among integrated index values derived for grid squares G among a plurality of the grid squares G extending in a horizontal direction with respect to the advancement direction of the subject vehicle M as a selected grid square SG.

The locus generating unit 138 generates a smooth curve approaching the selected grid squares SG selected by the selection unit 137 as much as possible and represented by a spline function (or a Hermit function) or the like and generates a target locus TL on the curve.

[Flowchart]

Figure 19:
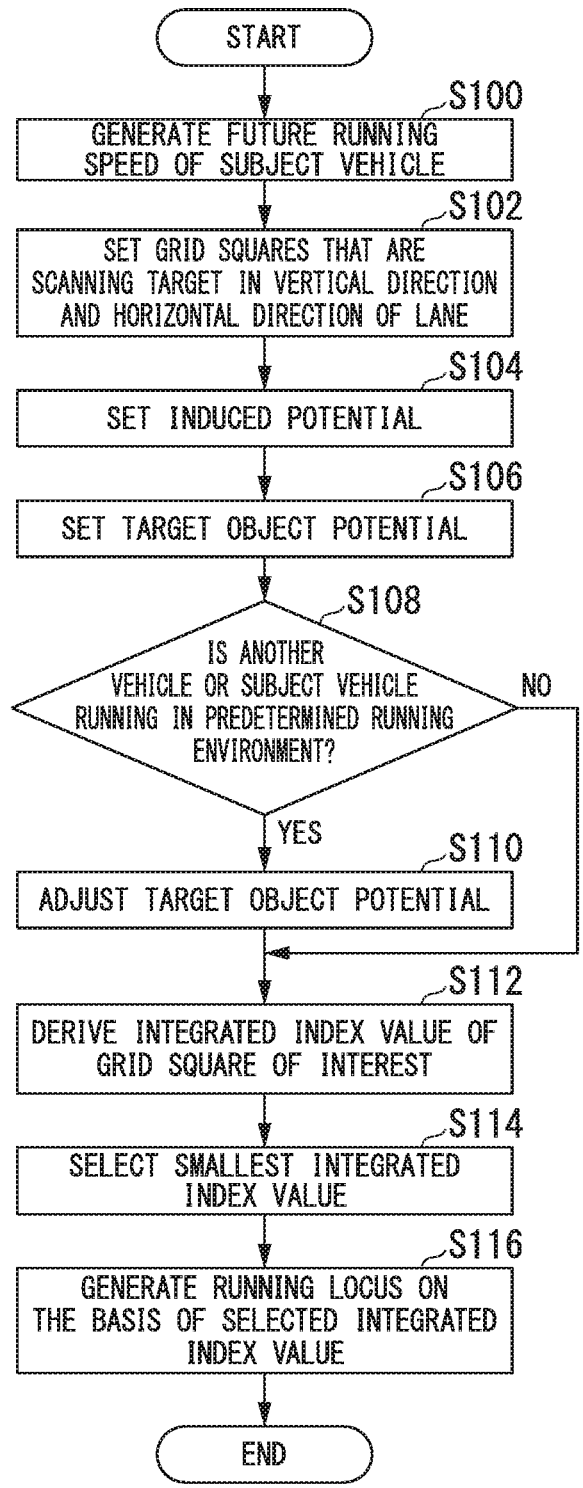
FIG. 19 is a flowchart showing one example of a process executed by an action plan generating unit according to an embodiment.

FIG. 19 is a flowchart showing one example of a process executed by the action plan generating unit 123 according to an embodiment. The process of this flowchart, for example, may be repeatedly executed at predetermined intervals or at predetermined timings. First, the speed generating unit 130 generates a current or future speed (target speed) of the subject vehicle M on the basis of a result of recognition executed by the external system recognizing unit 121 (Step S100). Next, the grid processing unit 131 sets grid squares G that are scanning targets in the vertical direction and the horizontal direction of the running lane of the subject vehicle M (Step S102).

Next, the induced potential setting unit 132 sets an induced potential Pi (Step S104). Next, the target object potential setting unit 134 sets a target object potential Po on the basis of an object (for example, another vehicle or an obstacle) recognized by the external system recognizing unit 121 (Step S106). Next, the target object potential setting unit 134 determines whether or not another vehicle or the subject vehicle M is running in a predetermined running environment (for example, a curved road) (Step S108). In a case in which another vehicle or the subject vehicle M is determined as running in the predetermined environment, the target object potential setting unit 134 adjusts the target object potential Po on the basis of the running environment (Step S110). In other words, the target object potential setting unit 134 differently sets the target object potential Po in a case in which the vehicle is determined as running in the predetermined running environment and a case in which the vehicle is determined as not running in the predetermined environment.

Next, the evaluation unit 136 derives an integrated index value of a grid square of interest on the basis of the induced potential Pi, the target object potential Po, and the prediction information (Step S112). Next, for grid squares in the vertical direction, the selection unit 137 selects a smallest integrated value among those of a plurality of grid squares in the horizontal direction (Step S114). Next, the locus generating unit 138 generates a future running locus of the subject vehicle M on the basis of the selected integrated index value (Step S116). In this way, the process of one routine of this flowchart ends.

According to the embodiment described above, a more appropriate running locus can be generated in accordance with a running environment. For example, according to the embodiment, the degree of influence of another vehicle running a curved road or the like on the subject vehicle can be set as being higher than that of a case in which the vehicle is running on a straight road, and accordingly, a running locus having a low likelihood of being in contact with another vehicle can be generated.

In the embodiment described above, although an example in which the vehicle control device is applied to the automated driving vehicle has been described, for example, the vehicle control device may be applied to a vehicle in which a driving support device giving a notification of the likelihood of being in contact with another vehicle to a vehicle occupant or performing contact avoidance on the basis of the magnitude of the integrated potential or the integrated index value is mounted.

<Hardware Configuration>

Figure 20:
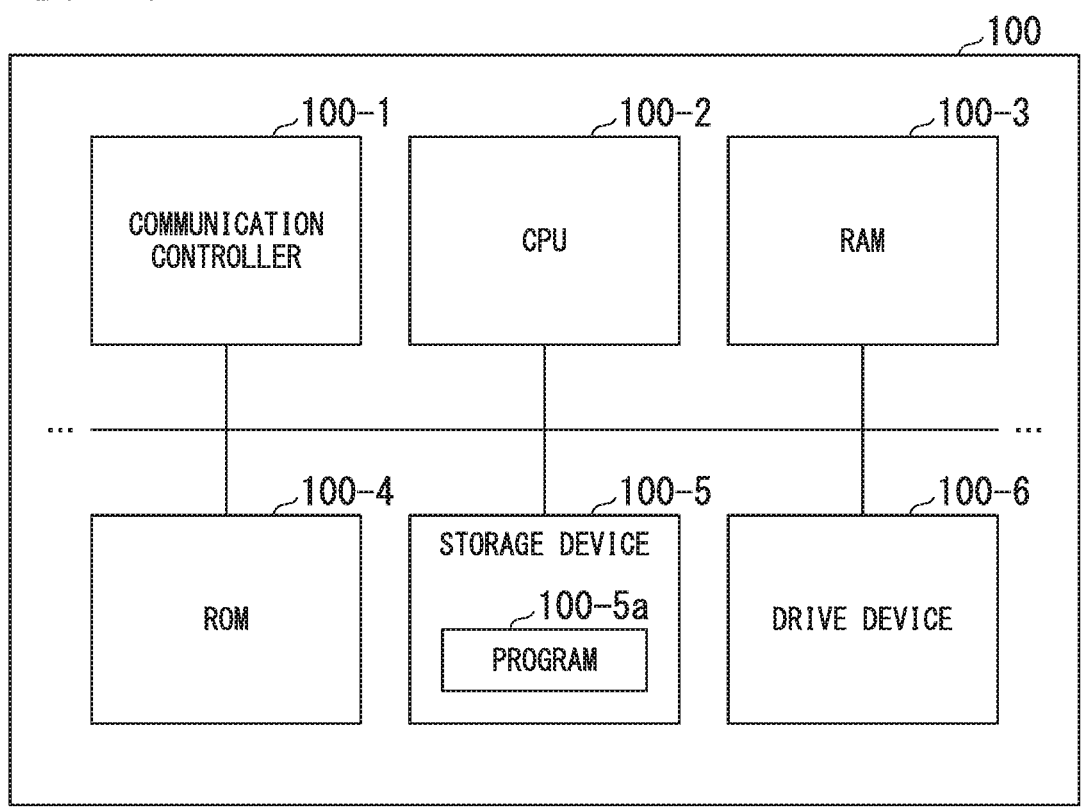
FIG. 20 is a diagram showing one example of the hardware configuration of an automated driving control unit according to an embodiment.

The automated driving control unit 100 according to the embodiment described above, for example, is realized by a hardware configuration as illustrated in FIG. 20. FIG. 20 is a diagram showing one example of the hardware configuration of the automated driving control unit 100 according to an embodiment.

The automated driving control unit 100 has a configuration in which a communication controller 100-1, a CPU 100-2, a RAM 100-3, a ROM 100-4, a secondary storage device 100-5 such as a flash memory or an HDD, and a drive device 100-6 are interconnected through an internal bus or dedicated communication lines. A portable storage medium such as an optical disc is loaded into the drive device 100-6. A program 100-5a stored in the secondary storage device 100-5 is expanded in the RAM 100-3 by a DMA controller (not illustrated in the drawing) or the like and is executed by the CPU 100-2, whereby the first control unit 120 and the second control unit 140 are realized. The program referred to by the CPU 100-2 may be stored in a portable storage medium loaded into the drive device 100-6 or may be downloaded from another device through a network NW.

The embodiment described above can be represented as below.

A vehicle control device includes a storage device storing information and a hardware processor executing a program.

In the storage device described above, the program described above is stored which is used for causing the hardware processor described above to execute a recognition process of recognizing surrounding vehicles of a subject vehicle and a potential setting process of setting a target object potential based on the surrounding vehicles recognized in the recognition process for a plurality of separate areas acquired by dividing a road area and differently setting the target object potential in accordance with whether or not the subject vehicle or the surrounding vehicles are running in a predetermined running environment.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
a processor that executes computer-executable components stored on a memory, the computer-executable components comprising:
a recognition unit configured to recognize surrounding vehicles of a subject vehicle;
a potential setting unit configured to set an induced potential based on a road area and a target object potential area based on the surrounding vehicles recognized by the recognition unit for a plurality of separate areas acquired by dividing the road area, and to differently set the induced potential and the target object potential area in accordance with a determination of whether the subject vehicle or the surrounding vehicles are running in a predetermined running environment,
wherein
the potential setting unit is configured to, in response to determining that the predetermined running environment is a curved road:
offset, relative to a case in which the predetermined running environment is not the curved road, a position of the induced potential in a direction away from an opposing lane, and
increase, relative to the case in which the predetermined running environment is not the curved road, the target object potential area on a side of the opposing vehicle directed toward the subject vehicle based on a curvature of the curved road;
a locus generating unit configured to generate a future running locus of the subject vehicle based on the induced potential and the target object potential area; and
a control unit configured to control operation of the subject vehicle based on the future running locus.

2. The vehicle control device according to claim 1, wherein the potential setting unit is configured to set the target object potential in a case in which the subject vehicle or the surrounding vehicles are running on the curved road to be different from that the target object potential in a case in which the subject vehicle or the surrounding vehicles are not running on the curved road.

3. The vehicle control device according to claim 2, wherein the potential setting unit is configured to change a degree of difference in setting the target object potential area based on the curvature of the curved road.

4. The vehicle control device according to claim 3, wherein
the predetermined running environment is the curved road having a curvature that is equal to or greater than a predetermined curvature, and
the potential setting unit is configured to set the target object potential area to be a first area in a case in which the subject vehicle or the surrounding vehicles are running on the curved road having the curvature that is equal to or greater than the predetermined curvature and to be a second area in a case in which the subject vehicle or the surrounding vehicles are not running on the curved road having the curvature that is equal to or greater than the predetermined curvature, wherein the first area and the second area are different.

5. The vehicle control device according to claim 1, wherein the potential setting unit is configured to differently set a degree of change in the target object potential area based on at least one of positions or behaviors of the surrounding vehicles.

6. The vehicle control device according to claim 1, wherein
the recognition unit is configured to recognize a road partition line between a position of the subject vehicle and positions of the surrounding vehicles, and the potential setting unit is configured to differently set the target object potential area depending on whether the road partition line is recognized by the recognition unit.

7. The vehicle control device according to claim 1, wherein the potential setting unit is configured to differently set the target object potential area depending on whether a likelihood of a change in a behavior of the surrounding vehicles is predicted.

8. The vehicle control device according to claim 1, wherein the computer-executable components further comprise:
an evaluation unit configured to derive an index value acquired by evaluating a potential of a separate area of interest, of the plurality of separate areas, based on the target object potential area, the induced potential set in the separate area, and prediction information generated for a surrounding separate area selected from surroundings of the separate area of interest; and
a selection unit configured to select one or more separate areas, of the plurality of separate areas, along an advancement direction of the subject vehicle based on the index value derived by the evaluation unit,
wherein the locus generating unit is configured to generate the future running locus of the subject vehicle based on the one or more separate areas along the advancement direction of the subject vehicle that are selected by the selection unit.

9. A vehicle control method executed by a computer mounted in a vehicle, the vehicle control method comprising:
recognizing surrounding vehicles of a subject vehicle;
setting an induced potential based on a road area and a target object potential area based on the surrounding vehicles for a plurality of separate areas acquired by dividing the road area, wherein the setting comprises:
differently setting the induced potential and the target object potential area based on a determination of whether or not the subject vehicle or the surrounding vehicles are running in a predefined running environment; and
in response to determining that the predetermined running environment is a curved road:
offsetting, relative to a case in which the predetermined running environment is not the curved road, a position of the induced potential in a direction away from an opposing lane, and
increasing, relative to the case in which the predetermined running environment is not the curved road, the target potential area on a side of the opposing vehicle directed toward the subject vehicle based on a curvature of the curved road;
generating a future running locus of the subject vehicle based on the induced potential and the target object potential area; and
controlling operation of the subject vehicle based on the future running locus.

10. A computer-readable non-transitory storage medium storing a program thereon, the program causing a computer to execute:
recognizing surrounding vehicles of a subject vehicle;
setting an induced potential based on a road area and a target object potential area based on the surrounding vehicles for a plurality of separate areas acquired by dividing the road area, wherein the setting comprises
differently setting the induced potential and the target object potential area based on a determination of whether the subject vehicle or the surrounding vehicles are running in a predetermined running environment, and
in response to determining that the predetermined running environment is a curved road:
offsetting, relative to a case in which the predetermined running environment is not the curved road, a position of the induced potential in a direction away from an opposing lane, and
increasing, relative to the case in which the predetermined running environment is not the curved road, the target potential area on a side of the opposing vehicle directed toward the subject vehicle based on a curvature of the curved road;
generating a future running locus of the subject vehicle based on the induced potential and the target object potential area; and
controlling operation of the subject vehicle based on the future running locus.

* * * * *